(12) United States Patent
Banhazi et al.

(10) Patent No.: US 9,311,556 B2
(45) Date of Patent: Apr. 12, 2016

(54) IMAGE ANALYSIS FOR MAKING ANIMAL MEASUREMENTS INCLUDING 3-D IMAGE ANALYSIS

(71) Applicant: PLF AGRITECH PTY LTD, Warwick, Queensland (AU)

(72) Inventors: Thomas Banhazi, Warwick (AU); Mark Dunn, Warwick (AU)

(73) Assignee: PLF AGRITECH PTY LTD, Warwick, Queensland (AU)

( * ) Notice: Subject to any disclaimer, the term of this patent is extended or adjusted under 35 U.S.C. 154(b) by 0 days.

(21) Appl. No.: 14/859,869

(22) Filed: Sep. 21, 2015

(65) Prior Publication Data

US 2016/0012278 A1    Jan. 14, 2016

Related U.S. Application Data

(63) Continuation-in-part of application No. 13/698,662, filed as application No. PCT/AU2011/000592 on May 19, 2011, now Pat. No. 9,142,028.

(60) Provisional application No. 61/346,310, filed on May 19, 2010.

(51) Int. Cl.
*G06K 9/00* (2006.01)
*G06K 9/46* (2006.01)

(52) U.S. Cl.
CPC ......... *G06K 9/46* (2013.01); *G06T 2207/30128* (2013.01)

(58) Field of Classification Search
None
See application file for complete search history.

(56) References Cited

U.S. PATENT DOCUMENTS

| 5,412,420 A * | 5/1995 | Ellis | A01K 11/006 348/135 |
| 5,644,643 A * | 7/1997 | Scofield | A01K 1/0613 119/840 |
| 5,944,598 A | 8/1999 | Tong et al. | |
| 7,110,572 B1 | 9/2006 | Benn | |
| 8,036,429 B2 * | 10/2011 | Doyle, II | A22B 5/007 119/416 |
| 8,351,656 B2 | 1/2013 | Spicola et al. | |
| 8,755,570 B2 * | 6/2014 | Gomas | G06T 7/0083 382/110 |
| 2005/0286750 A1* | 12/2005 | Dehmeshki | G06K 9/342 382/131 |
| 2009/0240432 A1* | 9/2009 | Osanai | G06T 7/0044 701/300 |
| 2011/0054338 A1* | 3/2011 | Linker | A61B 5/0816 600/529 |
| 2011/0196661 A1* | 8/2011 | Spicola | A01K 29/00 703/11 |

OTHER PUBLICATIONS

Brandl, R. et al, 'Determination of live weight of pigs from dimensions measured using image analysis', Computers and Electronics in Agriculture 15, 1996, pp. 57-72 (retrieved from http://www.sciencedirect.com/science/article/pii/0168169996000038) (see for example, section 1.3 and 2.1-2.2).

(Continued)

*Primary Examiner* — Shervin Nakhjavan
(74) *Attorney, Agent, or Firm* — Sand & Sebolt

(57) ABSTRACT

A computer-implemented image analysis process including accessing image data and range data representing an image of an animal, measuring an object volume from the range data and estimating the animal's weight using the dimensions representing the animal's size. A database containing relative volume and weight information can then be used to accurately predict the animal's weight from calculating its volume.

1 Claim, 32 Drawing Sheets

(56) References Cited

OTHER PUBLICATIONS

Doeschl-Wilson, A.B. et al, 'Using visual image analysis to describe pig growth in terms of size and shape', Animal Science (British Society of Animal Science), 2004, vol. 79 (part 3), pp. 415-427 (see, for example, sectin 'Data Acquisition' (pp. 416-417)).

Schofield, C. P., 'Evaluation of Image Analysis as a Means of Estimating the Weight of Pigs', Journal of Agriculture Engineering Research, vol. 47, Sep.-Dec. 1990, pp. 287-296 (retreived from http://sciencedirect.com/science/article/pii/002186349080048Y) (see, for example, section 3).

White, R.P. et al, 'The effectiveness of a visual image analysis (VIA) system for monitoring the performance of growing/finishing pigs', Animal Science (British Society of Animal Science), 2004, vol. 78 (part 3), pp. 409-418 (see, for example, the abstract, section 'Material and Methods' (pp. 410-411)).

\* cited by examiner

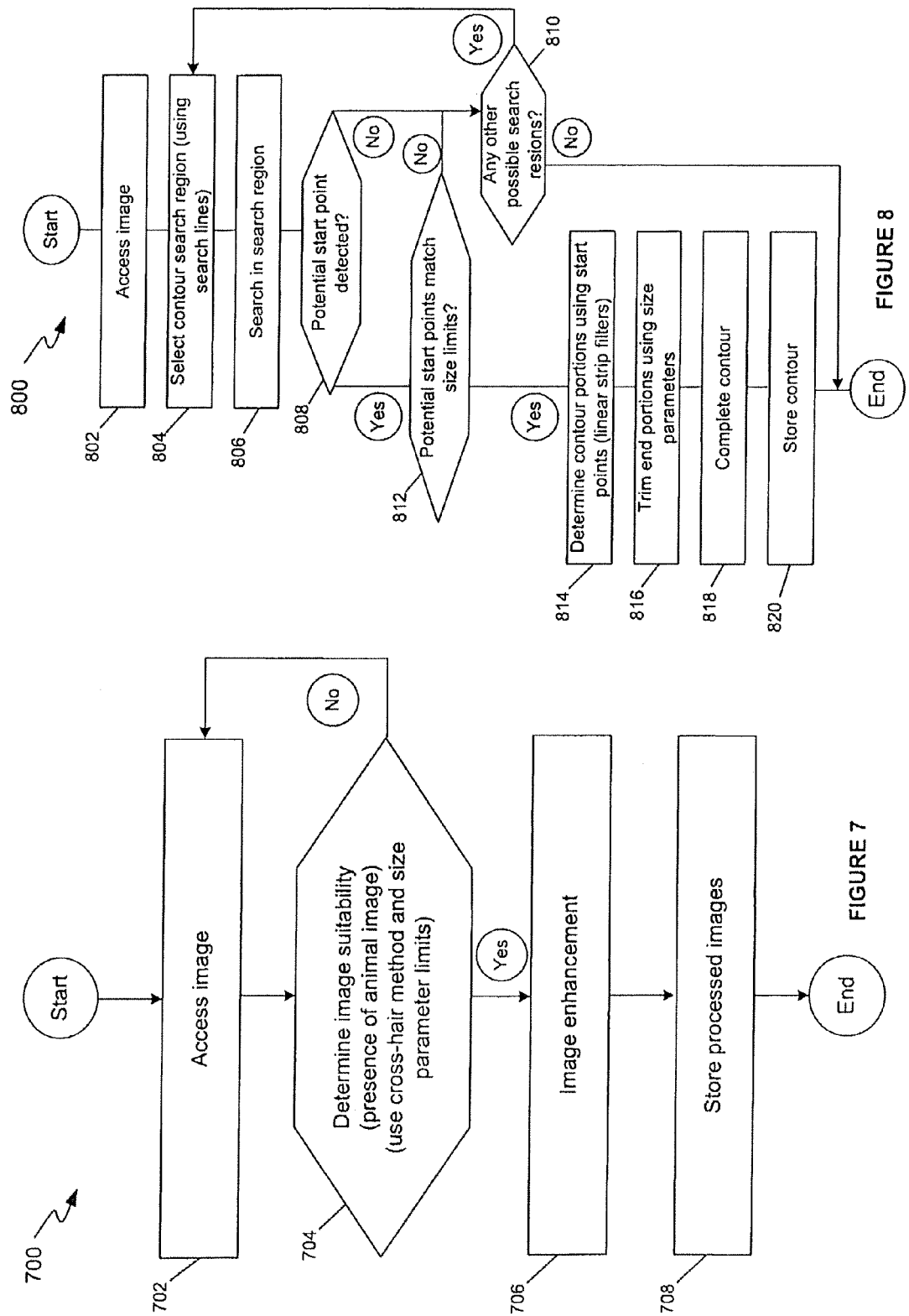

FIGURE 16      FIGURE 17      FIGURE 18

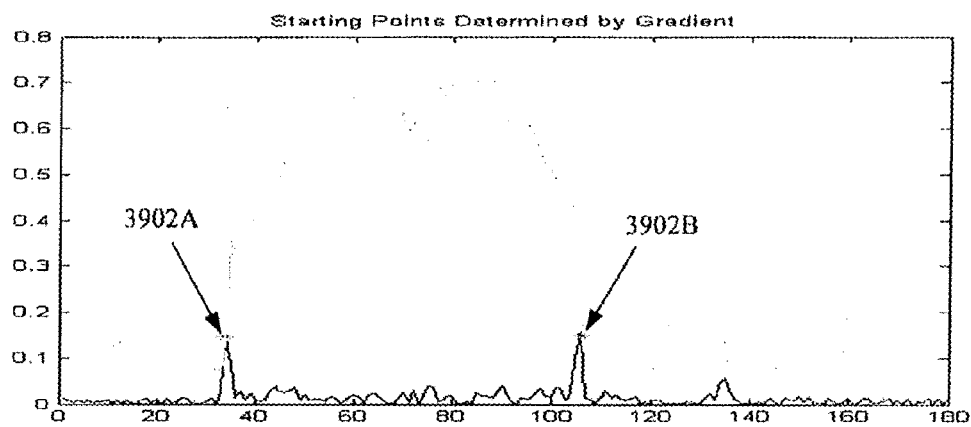
FIGURE 39
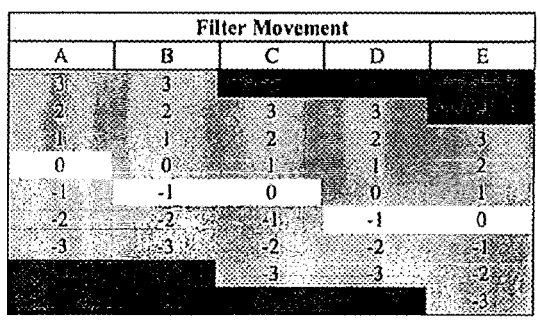 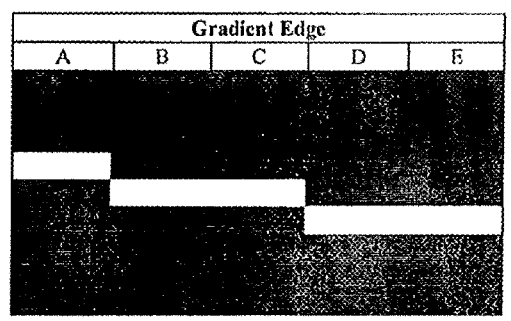
FIGURE 40A　　　　　　　　　　　FIGURE 40B

IMAGE ANALYSIS FOR MAKING ANIMAL MEASUREMENTS INCLUDING 3-D IMAGE ANALYSIS

CROSS-REFERENCE TO RELATED APPLICATIONS

This is a Continuation-in-Part of U.S. patent application Ser. No. 13/698,662 filed Nov. 18, 2012 which is a National Stage Entry of PCT/AU2011/000592 having an international filing date of May 19, 2011, which claims the benefit of U.S. Provisional Patent Application Ser. No. 61/346,310 filed May 19, 2010, the entire disclosures of which are incorporated herein by reference.

FIELD

The present invention relates to image analysis for making animal measurements. The analysis may involve detecting a boundary contour of an animal object within an image representing an animal, estimating the animal's size using dimensions extracted from the boundary contour found within the image, and estimating the animal's weight using the dimensions representing the animal's size. The animals can be livestock animals, such as pigs.

BACKGROUND

In livestock farming, it is important to monitor regularly the weight of living (or in vivo) domesticated animals e.g., pigs, etc., to give an indication of the animals' rate of growth. An animal's growth rate is important as it can determine the profitability of a farming enterprise, especially where meat production is concerned. The weight and health of the livestock can also be related back to the size, shape and condition of the animal. The study of the relationship between shape and weight is referred to as allometry.

Traditionally, weighing livestock is performed manually on-farm using mechanical or electronic scales. This practice is very labour intensive, time consuming and potentially dangerous. Furthermore, the procedures associated with manual weighing are stressful for the animals and the stockmen involved. Computer systems can be used in some conditions for determining information about animals based on images of the animals. Computer-based image analysis can predict a live animal's weight based on body measurements extracted from an image containing an animal (also referred to as an animal image). These body measurements can then be used to predict the animal's weight.

Existing image analysis systems and methods, have insufficient weight prediction accuracy, image capture reliability, and feature extraction reliability, particularly in farming or livestock-handling environments where lighting can be non-uniform (variable).

Furthermore, existing weight estimation methods can be too slow for high-throughput farming environments where many measurements are required.

It is desired to address or ameliorate one or more disadvantages or limitations associated with the prior art, e.g., as described above, or to at least provide a useful alternative.

SUMMARY

Therefore in one form of the invention there is proposed a computer-implemented image analysis process for making animal measurements, including:

acquiring the range image data representing a range image including an animal object representing an animal;
selecting all points in the range image that are less than a distance representing the floor;
selecting individual connected solid objects in the set of points that are selected;
selecting the boundary of the connected solid objects;
selecting valid boundaries by selecting each sample boundary that matches a template boundary corresponding to an expected animal shape; selecting subset of the valid boundary by detecting the animal head and removing it;
calculating the volume of the selected object by integration of the vertical distance of each point on the object to the floor; and
looking up a database including information correlating the volume of the animal with a weight in the database.

BRIEF DESCRIPTION OF THE DRAWINGS

Preferred embodiments of the present invention are hereinafter further described, by way of example only, with reference to the accompanying drawings, in which:

FIG. 7 is a flowchart of an image pre-processing process of the image analysis process;
FIG. 8 is a flowchart of a contour detection process of the image analysis process;
FIG. 16 is a graph of an intensity profile along the front position-monitoring line in the image of the FIG. 15;
FIG. 17 is a graph of an intensity profile along the middle lateral position-monitoring line in the image of FIG. 15;
FIG. 18 is a graph of an intensity profile along the rear position-monitoring line in the image of FIG. 15, showing image intensities associated with the background and an animal object.

FIG. 39 is a graph of the image gradient along the mid portion line showing edge starting points;

FIG. 40A is a graph of pixels in the image gradient showing movement of a filter from column A to column E;

FIG. 40B is a graph of the pixels in the image gradient showing the determined maximum gradient in columns A to E;

DETAILED DESCRIPTION

Overview

Figure 1:
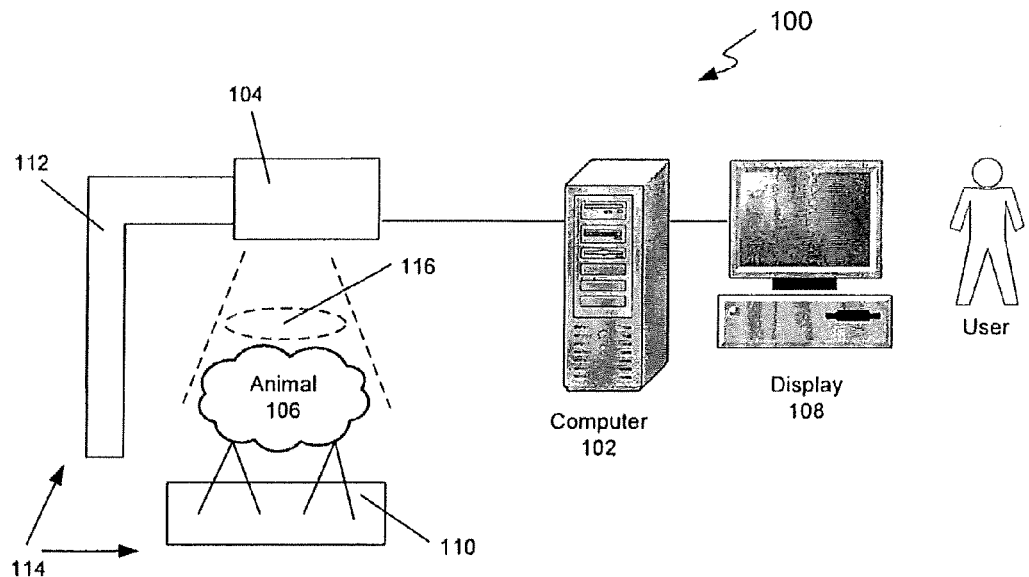
FIG. 1 is a schematic diagram of an image analysis system.

An image analysis system 100 provides an image analysis process 500, which detects an animal image boundary or a boundary contour of an animal (also referred to as an animal object) representing an animal in an image, and generates boundary data representing the boundary contour. The image includes an arrangement of pixels with intensity values represented by image data. The image is typically captured and pre-processed to ensure a substantially whole animal is represented. The contour is used to determine size and shape information of the animal, and this is used, in an allometry process, to determine or estimate animal characteristics, such as weight. The image analysis process 500, as described hereinafter, can efficiently detect the contour by first identifying start points of the contour, then detecting further portions starting at the start points, using on an intensity gradient of the image.

The animal image boundary, or contour, includes side boundaries at the edges of the animal object.

Generating the boundary data includes determining, detecting or tracing at least a portion of the boundary or contour around the animal object in the image. The process of contour detection can also be referred to as "segmentation". Selecting the plurality of start or starter points is referred to as "seeding" in the process of generating the boundary data.

The contour detection process can identify an object positioned generally horizontally in an image (±45° orientation). The process performs segmentation locally in a step-wise manner, incrementally processing pixel neighbourhoods and identifying the co-ordinate of the maximum gradient within the local neighbourhood at each step. This method is referred to as a trace or chain code. The "local neighbourhood" refers to a small section of an image often called a 'neighbourhood of pixels'. Processing locally can result in a huge reduction in the number of pixels being passed through the processor in the extraction or segmentation phase, e.g. 90% of the image pixels may remain uninspected, therefore providing a reduction of about 90% in the time taken to segment the object from the image. In contrast, processing the image globally would result in every pixel being passed through the processor including all redundant information. The absolute maximum gradient of the 'neighbourhood of pixels' is calculated and used to identify the edge or boundary between the object and the background image.

Finding the contour between an image of at least one animal in a background image can be a critical bottleneck in automatic animal analysis systems. The use of selected start, or "seed", points to determine at least part of the animal contour can be a computationally efficient process, and can be performed rapidly, thus it is possible to determine a plurality of animal contours in a short period of time, e.g., for processing a plurality of animal images in real time, or at least near real time. For example, as the described contour detection process is rapid, it can be used to detect and discard (as unsuitable) a large number of potential start points in a search to find start points that correspond to an expected animal shape, e.g., when used in detecting a contour of one animal image in a group of animal images, as described below with reference to FIG. 26.

The image analysis process 500 can operate well in non-uniform lighting conditions, i.e., where light falling on the animal in the image is non-uniform spatially and/or temporarily.

The image analysis system 100 can provide continuous information about key animal characteristics which can be of importance in livestock production. This information can be used to improve productivity, efficiency, profitability, safety and animal health in farms, etc. Animal weight is an example key parameter in at least pig production. The image analysis system 100 may also be used to determine other animal characteristics, including animal health and welfare, body composition and condition, and/or animal behavioural traits.

Image Analysis System 100

The image analysis system 100, as shown in FIG. 1, includes a computer 102 for processing image data from an image capture device 104 representing an animal 106, and displaying information generated by the image analysis on a display 108 for a user.

The animal 106 can be a farmed or livestock animal, for example a cow, a pig, a sheep, a fish, etc.

The image capture device 104 can be a still camera or a video camera for generating image signals representing images of the animal 106.

The animal 106 is positioned in a field of view 116 of the image capture device 104 using restraints 114 or restraint structures, e.g., a walkway 110, for restraining or defining a position of the animal 106 and a stand structure 112 for locating and defining a position of the image capture device 104. The arrangement of the restraints 114, including the walkway 110 and the stand structure 112, allows the animal 106 to appear wholly in the field of view 116 of the image capture device 104, thereby allowing the image capture device 104 to generate images showing the whole of the animal 106 with the non-animal portion of each image forming a background.

The image capture device 104 is in electronic communication with the computer 102 for sending signals, and data from digital image capture, to the computer 102 representing the images captured by the image capture device 104.

In some embodiments, the image capture device 104 can generate monochrome images, or alternatively colour images with data representing a plurality of colours (e.g., three colours: red, green and blue; or four colours: cyan, magenta, yellow and black). Each colour has a pixel array (or matrix) of intensity values for that colour. The image analysis system 100 can be configured to use only data representing pixel intensities of only one of these colour channels, and/or a combination of the colour channels. The combination can be selected based on the intensities of light that the image capture device 104 detects from the animals and from the background. In other embodiments, the image capture device 104 detects electromagnetic radiation at non-visible wavelengths to generate the images, e.g., an infrared camera generates monochrome infrared images, an ultra-violet (UV) detector generates images based on detected UV light, etc. The image capture device 104 can generate images by detecting two-dimensional frames of signals in various forms, e.g., using ultrasound, X-ray, laser scanning (or "light striping"), etc. Laser scanning may be implemented as described in the article by Bol A, Saunders C, and Banhazi T (2009) entitled "Evaluating laser-scanning as a potential technology for measurement of livestock body dimensions" (in "SEAg 2009", Brisbane, 2009; Eds T. Banhazi, and C Saunders; CD publication SEAg).

The image analysis system 100 can be located in an animal rearing environment, such as a shed on a farm, and the user is a person concerned with characteristics of the animal 106, including for example, its size and weight. The user can be a farmer or a scientist inspecting the animals (including the animal 106). In other embodiments, at least portions of the computer 102 may be located at a remote site for remote analysis of the animal 106; for example, the user may be an administrator monitoring conditions of the animal 106 at a plurality of farms from a plurality of image capture devices 104.

In embodiments, the computer 102 is a single computing device. In other embodiments, the computer 102 includes a plurality of computing components, including a high-speed processing component in communication with the image capture device 104 using a high band width or "fast" communications connection, whereas other portions of the computer 102 are connected to the high-speed portion using lower speed communications connections. For example, the computer 102 may include a pre-processor essentially installed with the image capture device 104, and one or most post processing components installed with the display 108.

Figure 2:
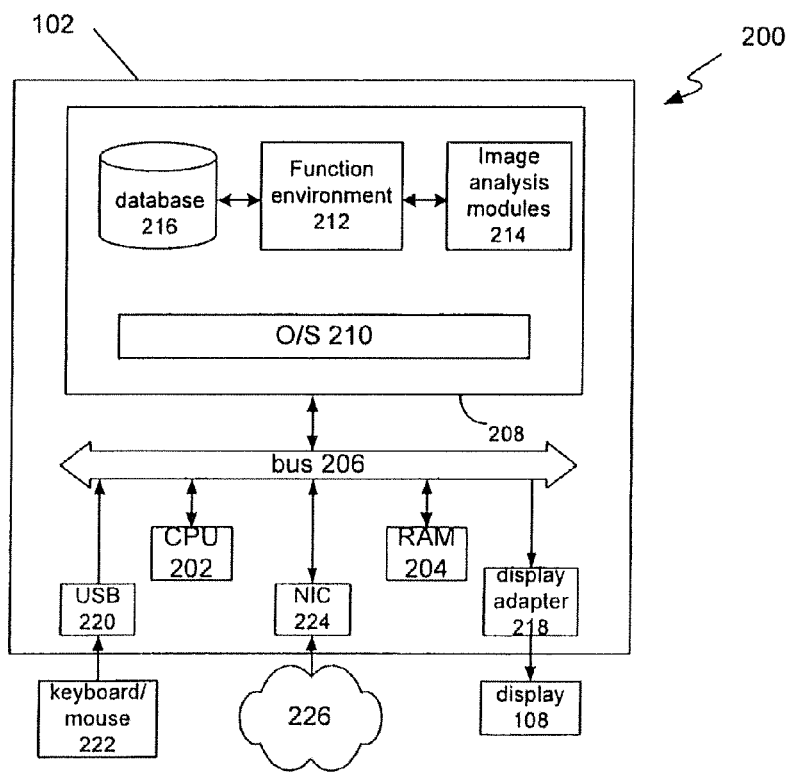
FIG. 2 is a block diagram of a computing system of the image analysis system.

The computer 102 and the display 108 are parts of a computing system 200, which includes standard computing components, as shown in FIG. 2, including one or more processors (including a central processing unit or CPU 202), computer-readable memory (including random access memory, or RAM 204), all connected by a computer bus 206 to computer-readable storage (including a hard disc drive or HDD 208). The HDD 208 includes an operating system (O/S) 210, such as Microsoft Windows, Unix or Lennox operating system. The HDD 208 includes a function environment 212, which is standard analytical processing system or numerical computing environment such as MATLAB (from The Math Works Inc., Natick, Mass., United States of America), supported by the O/S 210. The environment 212 includes predefined standard functions to process image data, and to access a database 216 of the HDD 208. In embodiments, the database 216 can include external databases, in one or more database servers of the computing system 200 external to the computer 102, and in communication with at least the O/S 210. The HDD 208 includes a plurality of image analysis modules 214 which configure the computer 102 to perform image analysis processes of the image analysis system 100.

The computer 102 includes a display adaptor 218 in communication with the bus 206 for displaying a graphical user interface on the display 108 based on display data generated in the computer 102. The computer 102 includes a serial interface, such as a universal serial bus (USB) 220 for receiving user input from user input devices, e.g., a keyboard and/or a mouse 222. The computer 102 includes a communications interface, e.g., a network interface card (NIC) 224, to provide communications to an external network 226, e.g., a data network such as the Internet and/or a direct communications link to the image capture device 104.

Together, the image analysis modules 214 and the function environment 212 provide the computing system 200 with the general ability receive, store, access, process and send image data representing the captured animal images.

In embodiments, one or more portions of the image analysis modules 214 are not in the computer 102, but are stored and/or operative in other computing facilities in the image analysis system 100, e.g., in the image capture device 104 (which can have an image pre-processor), and/or in computing facilities accessible via the network 226 (such as a personal digital assistant which receives and displays reports).

The computing system 200 normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Software Components 300 and Data Storage Structures 400

Figure 3:
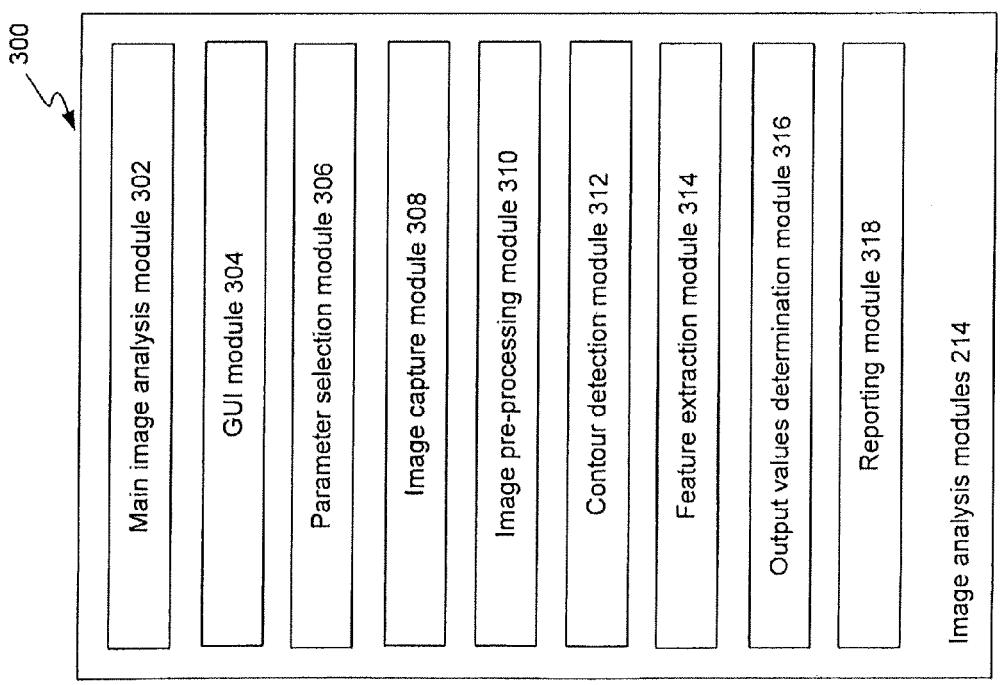
FIG. 3 is a block diagram of software components of the image analysis system.

The functionality of the image analysis system 100 can be provided by a plurality of software components 300, including the image analysis modules 214. As shown in FIG. 3, the image analysis modules 214 include a main image analysis module 302 for performing the image analysis process 500 and a graphical user interface (GUI) module 304 for generating data used to represent a graphical user interface (GUI) on the display 108, and for receiving input information representing data from the GUI. The image analysis modules 214 include a plurality of sub modules of the main image analysis modules 302 for performing at least some of the sub processes of the image analysis process 500. These sub modules include a parameter selection module 306 for receiving and storing parameter value data representing values of parameters used in the image analysis process 500, e.g., from the GUI module 304. The sub modules include an image capture module 308 for receiving, processing and storing image data from the image capture device 104. The sub modules include a contour detection module 312 for detecting contours or boundaries in images received from the image capture device 1 04. The sub modules include a feature extraction module 314 for extracting features (e.g., distances and sizes) from images using the detected contours. The sub modules include an output value determination module 316 for determining relevant output values using the extracted features, e.g., for determining animal weight from the extracted animal size. The sub modules include a reporting module 318 for generating data representing reports for the user, e.g., for displaying images, including the animal image and a detected contour, and for displaying output values, e.g., weight, on the display 108 using the GUI module 304. The reporting module 318 can also generate reporting data for storage, e.g., in the database 216, such as data representing extracted features and output values for analysis at some future time, e.g., for statistical analysis and/or accounting purposes.

It will be understood by those skilled in the art that each of the steps of the processes described herein may be executed by a module (of the software components 300) or a portion of a module. The processes may be embodied in a machine-readable and/or computer-readable medium for configuring a computer system to execute the method. The software modules may be stored within and/or transmitted to a computer system memory to configure the computer system to perform the functions of the module. The boundaries between the modules and components in the software components 300 are exemplary, and in alternative embodiments components or modules may be merged or have an alternative decomposition of functionality of modules. For example, the modules discussed herein may be decomposed into submodules to be executed as multiple computer processes, and, optionally, on multiple computers. Moreover, alternative embodiments may combine multiple instances of a particular module or sub-module. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Figure 4:
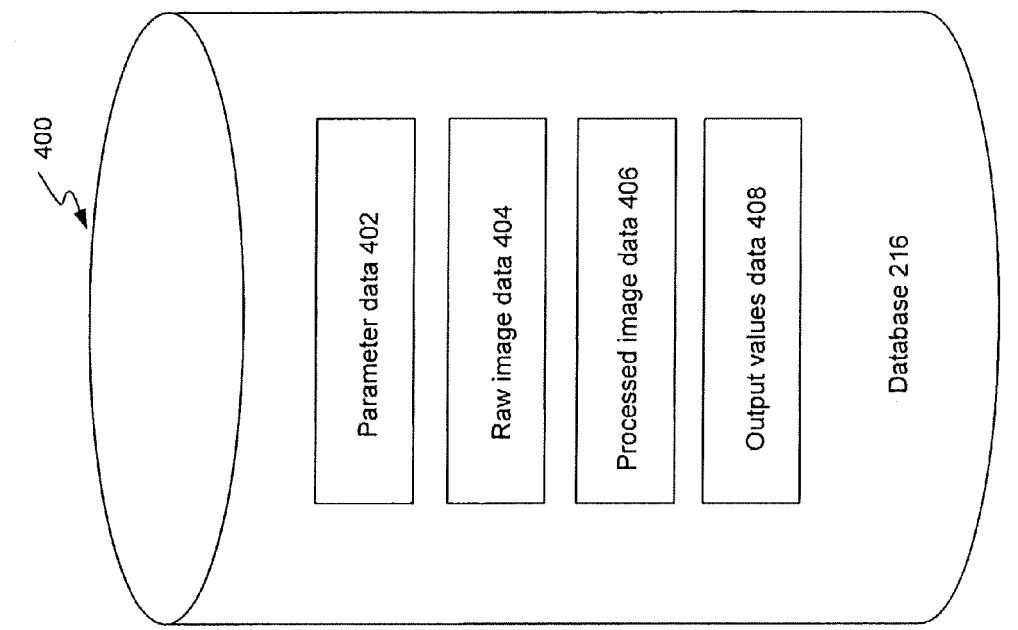
FIG. 4 is a block diagram of data storage structures of the image analysis system.

The image analysis system 100 includes a plurality of data storage structures 400, as shown in FIG. 4, in the database 216. The data storage structures 400 include computer readable data records for:

(i) parameter data 402 (for storing parameters and parameter values used in the image analysis process 500);

(ii) raw image data 404 (for storing raw image data from the image capture device 104, e.g., data prior to pre-processing);

(iii) processed image data 406 (including detected contour data and extracted feature data associated with each image, and other relevant metadata); and (iv) output values data 408 (including representing output values from the output values determination module 316 for the reporting module 318).

Image Analysis Process 500

Figure 5:
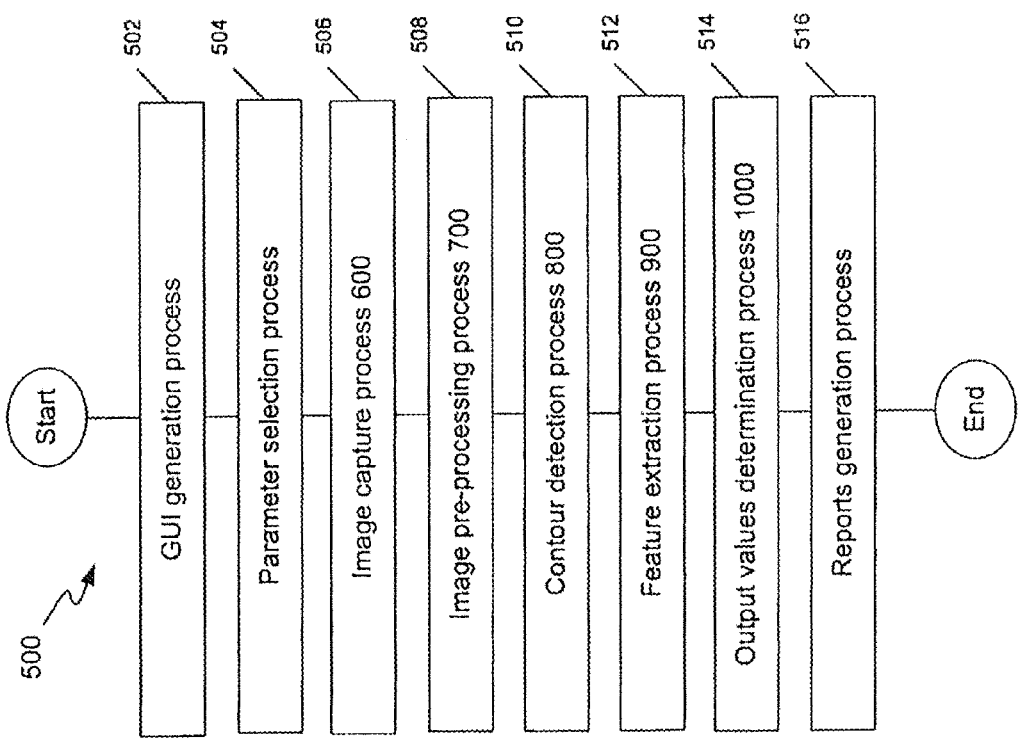
FIG. 5 is a flowchart, of an image analysis process performed by the image analysis system.

As shown in FIG. 5, the image analysis process 500 commences with generation of the graphical user interface (GUI) in a GUI generation process (step 502) which allows the user to enter values for parameters used in the image analysis, process 500. For example, the user can enter values corresponding to valid weight ranges for the animals being imaged, and desired confidence limits for the output values generated in the process, e.g., a confidence limit of 95% on one or more of the determined size values. These parameters are entered in a parameter selection process (step 504).

The image analysis process 500 receives images for analysis in an image capture process 600 (step 506) in which images, captured by the image capture device 104, are received by the computer 102 and stored as raw image data 404 in the database 216 for processing. The raw image data 404 are processed in an image pre-processing process 700 (step 508) in which unsuitable-images are rejected from any further analysis, and the images are "enhanced" in preparation for detection of the contour or boundary of an animal object and a background of the image in a contour detection process 800 (step 510). The image analysis process 500 includes a feature extraction process 900, in which features or measures of interest are extracted using the contour from the contour detection process 800 (step 512). Output values are determined using the extracted features in an output values determination process 1000 (step 514). The output values are used to generate reports, including to the graphical user interface, in a reports generation process (step 516).

Although described above as a linear process, the image analysis process 500 includes one or more iterative loops, for example the image capture process 600 may be repeated continuously, (or at least frequently) thus generating a stream of a plurality of images for the pre-processing process 700, which in turn continuously pre-processes the images and generates images for contour detection in the contour detection process 800. By operating the various sub processes of the image analysis process 500 continuously, the image analysis system 100 can capture, analyse and generate relevant information in real time about the animal 106, or a plurality of animals in the field of view 116 of the image capture device 104. The plurality of animals in the field of view 116 may be a group of animals visible to the image capture device 104, and/or a moving sequence of animals which appear singly or in groups in the field of view 116.

Operating one or more of the sub processes of the image analysis process 500 in iterative loops allows different processes to be performed by different modules in the sub modules of the main image analysis module 302, which may in turn operate on different processes of the computer 102. For example, the image capture process 600 and the image pre-processing process 700 can be extremely data-intensive processes that require specific high-performance hardware to provide output information in a sufficiently convenient time for the other processes in the image analysis process 500 and/or for the user.

Image Capture Process 600

Figure 6:
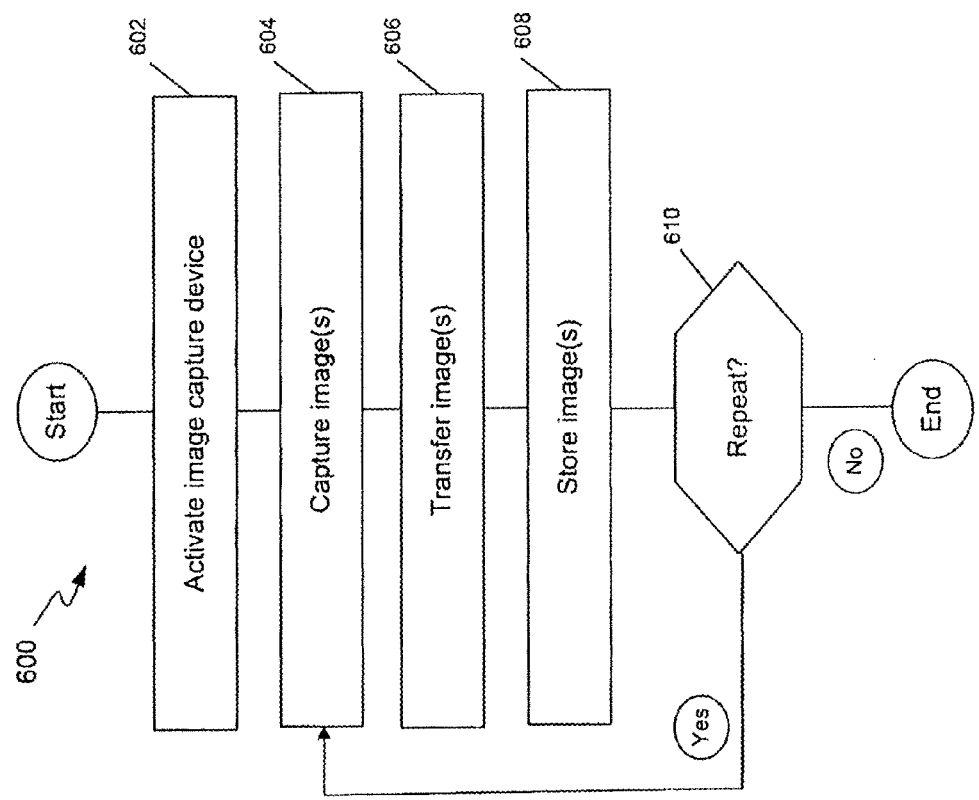
FIG. 6 is a flowchart of an image capture process of the image analysis process.

The image capture process 600 is performed by the image capture module 308 of the image analysis modules 214 which operates in the computer 102 and/or in computing facilities of the image capture device 104. In the image capture process 600, as shown in FIG. 6, the image capture module 308 activates the image capture device (step 602), captures one or more images (step 604), transfers the images to the computer 102 (step 606), and stores the images in the database 216 (step 608). For a digital image capture device 104, such as a charge couple device (CCD) camera, digital images are sent from the image capture device 104 to the computer 102 for storage. The image capture module 308 determines whether further images are to be captured (step 610), and if so captures a further image by returning to step 604. As mentioned above, the image capture process 600 is executed typically in an iterative loop, thus providing a quasi-continuous sequence of images from the image capture device 104 for analysis by the computer 102.

Image Pre-Processing Process 700

The image pre-processing process 700, as shown in FIG. 7, commences with the image pre-processing module 310 accessing the image data representing the image (step 702), and determining suitability of the image for further processing in the image analysis system 100 (step 704).

Accessing the image data can include receiving data directly from the image capture device 104 and/or reading stored data from the raw image data 404.

Determining image suitability can include determining the presence of an animal image in the image, e.g., by using one or more predefined thresholds on image characteristics known to exist between images with a substantially complete animal 106 in the image and images only including a background (e.g., the walkway 110). The presence of an animal image can be determined using a so-called cross-hair method, and predetermined size parameter limits. In the cross-hair method, one or more position-monitoring (or position-determination) lines are selected that cross the image, each line corresponding to a virtual plane parallel to an optical line between the image capture device 104 and the animal 106 or walkway 110 in the field of view 116. An animal 106 walking onto the walkway 110 will pass into and through these virtual planes which act as virtual gates or motion detectors. If an animal 106 is present in a virtual plane when the image is captured, the intensity profile of the image along the corresponding position-monitoring line will represent part of the animal, as opposed to simply representing the background which is normally in the virtual plane. By monitoring the position-monitoring lines, the image pre-processing module 310 can determine whether an animal is present at least where the virtual planes are defined. For example, lateral (or transverse) virtual planes can be defined towards the start of the walkway 110, towards the end of the walk way 110, and down the centre of the walkway 110: in this case, the presence of an animal 106 in all of the lateral virtual planes, represented by corresponding position-monitoring lines, indicates the presence of an animal in the image sufficient to perform further processing, and thus the image is determined to be suitable (i.e., not rejected) in step 704. The position-monitoring lines can be selected to be rows or columns of the image pixels, which may simplify processing and/or coding requirements of the image pre-processing process 700. (An example implementation of the cross-hair method is described hereinafter, with reference to FIGS. 15, 16, 17, 18 and 19.) If the image being tested is determined to be unsuitable in step 704, the image pre-processing module 310 accesses a further image in step 702.

If the image is determined to be suitable in step 704, the image pre-processing module 310 performs one or more enhancement processes on the image (step 706), which can include:

(i) reducing background noise in the image (e.g., using a median filter, such as "medfilt2" in Matlab, or a similar routine implemented from C++);

(ii) increasing image contrast (e.g., using the image processing tool "imadjust" in the Matlab image processing toolbox, or an equivalent C++ routine);

(iii) adaptive thresholding of the image (e.g., using Otsu's method as described in "A Threshold Selection Method from Gray-Level Histograms", by N. Otsu, in IEEE Transactions on Systems, Man, and Cybernetics, 1.979, Volume 9, pages 62 to 66); and/or (iv) morphological opening and closing operations to smooth and eliminate unwanted pixels and to fill holes left after thresholding.

The image pre-processing module 310 can continuously perform the image pre-processing process 700 to select suitable images from the raw images being continuously generated by the image capture process 600. The selected suitable enhanced images are stored in the processed image data 406 in the database 612 (step 708).

Contour Detection Process 800

In the contour detection process 800, as shown in FIG. 8, the contour detection module 312 accesses image data representing an image including an animal object in a background stored in the processed image data 406 (step 802). The contour detection module 312 then selects one or more contour search regions in the image (step 804). The contour search regions are one or more regions in which the contour detection module 312 will search for at least a portion of the contour. For example, the contour search regions may be search lines, for example one or more straight lines across the image. The search lines may commence at an edge of the image, or from any selected point in the image (e.g., in the image's centre, or where the animal object has been located in the image pre-processing process 700, e.g., using the crosshair method, etc.).

In embodiments, the contour search regions can be the same as the position-monitoring lines, which may have already been identified as including a part of the animal image, and thus potential start points for the contour detection.

Following selection of the contour search region, the contour detection module 312 performs a search in the search region (step 806) to locate a start position or start "point" (meaning one or more adjacent pixels in the image) where an intensity gradient in the image indicates that there is a boundary around an image region representing the animal, i.e., a boundary between the animal object and the background (step 806). Detection of one or more start points is determined using the maximum gradient in intensity which is associated with the difference between image intensity for the animal and for the background.

If no potential start point is detected (as tested in step 808), the contour detection module 312 determines whether any other possible contour search regions exist (step 810). If further regions exist, as determined in step 810, the contour detection module 312 attempts to search for a further potential start point in step 804.

In embodiments, all (or at least a plurality of) potential search regions are searched for potential start points in parallel, rather than iteratively in series. The search can include selecting two intensity maxima along the search line as two potential start points.

If a potential start point is detected in step 808, and if a plurality of start points have been detected, associated with a plurality of contour search regions which are searched simultaneously, or directly in a series, in step 806, the contour detection module 312 determines whether the distance between at least two of the potential start points matches predetermined expected size limits of the animals being imaged (step 812). The predetermined size limits are distances defined by values in the parameters in the parameter data 402 for expected sizes of the animal 106 as seen from the image capture device 104 in the particular configuration of the image analysis system 100. The size limits used in step 812 can also be associated with the selected contour search regions used in step 804: for example, if the contour search regions are lines transverse the longitudinal axis of the animal object, and the size limits can be expected approximate animal image widths defined in pixels (which then correspond to actual animal sizes with a fixed and known location and orientation of the image capture device 104 with respect to the defined location of the animal 106 in the field of view 116). For example, if two potential start points are either extremely close in the image or spaced far apart in the image compared to expected animal sizes, at least one of these potential start points can be rejected in step 812. If the potential start points do not match the size limits, the contour detection module 312 determines whether any other possible search regions are available in step 810.

If the potential start points do match the size limits, as tested in 812, the contour detection module 312 detects at least a portion of the contour, or boundary between the animal object and the background starting at these matching start points (step 814). The start points are also referred to as "seed" points as they seed the contour detection process in step 814. The contour determination processing step 814 is an iterative process to determine at the least a portion of the animal object boundary contour using the image gradient in the vicinity of each start point, and then progressing to use the image gradient in the image adjacent, or in the neighbourhood of, a previously determined portion of the contour.

For example, a linear strip filter with a predetermined width, defined by values in the parameter data 402, can be used to operate along the boundary in one direction starting at each start point. Each linear strip filter identifies the maximum absolute gradient in the neighbourhood group of pixels, in a direction away from its starting point. The pixel coordinates (e.g., X-Y coordinates) or locations of these maximum gradient points are recorded and used to form the detected portion of the contour (e.g., top and bottom or side portions of the animal object). In embodiments, the linear strip filters have a two-dimensional size of one pixel in width and seven pixels in length (i. e., generally perpendicular to the side contour), such as $[-3:-2;-1;0; 1;2;3]$. For example, a vertical filter can be used for simplicity and speed as movement is forced from the middle of the image outward ($\pm x$ direction only). The linear strip filter can be implemented as a "for" loop, or similar, in Matlab, or $C^{++}$. The loop can retrieve the relevant section of the image data and calculate the correct co-ordinate point of the edge point of the object at each iteration. Preferably, the linear strip filters are oriented within about $\pm 45°$ of the perpendicular to the boundary contour so each filter can be small (e.g., 1×7 pixels). Larger filters can process larger angles from perpendicular, but are slower to use.

The contour detection process in step 814 continues to iterate until an end condition is met, for example a maximum length of the determined boundary portion, or reaching an edge of the image, or reaching a different portion of the determined contour, or changing direction too rapidly to correspond to an expected animal shape (e.g., using a curvature parameter defined in the parameter data 402). For start points detected on the sides of the animal object, the determined contour can follow the edge of the animal object until the quality of the image degrades, for example at a longitudinal end of the animal object, where head features or tail features can appear.

To remove the determined portions of the contour that are degraded by unclear parts of the image, the end portions of the determined contour are removed or trimmed using predetermined size values in the parameter data 402 (step 816). For example, the trimming parameters may define a minimum animal width, and if side portions of the determined contour portions are closer than the minimum animal width, these portions are trimmed. The trimming value is based on a percentage of the width of the object. The width is found perpendicular to the longitudinal axis running down the midline of the animal body. The trim is set at around 85-90% of this determined width. The predetermined trim parameter values are defined in the parameter data 408 and are defined with respect to the particular configuration of the image analysis system 100, e.g., taking into consideration the distance between the image capture device 104 and an expected position of the animal 106, or taking into account previous animal measurements used for calibration.

Once the ends are trimmed in step 816, the contour detection module 312 automatically generates a complete contour by fitting an approximate line to gaps in the determined portions of the contour that provide an approximate outline of the animal. For example, gaps at the longitudinal end portions, generated by the trimming in step 816, can be completed using curve fitting methods such as spline curve fitting (e.g., using the Matlab functions "csaps" and "fnplt", or similar routines implemented in C++). Using spline curves can reduce the size of the data array used to represent the contour, or Cartesian points can be created from the spline curve. At the end of the contour detection process 800, the contour detection module 312 stores data representing the determined contour in the processed image data 406 (step 820).

Feature Extraction Process 900

Figure 9:
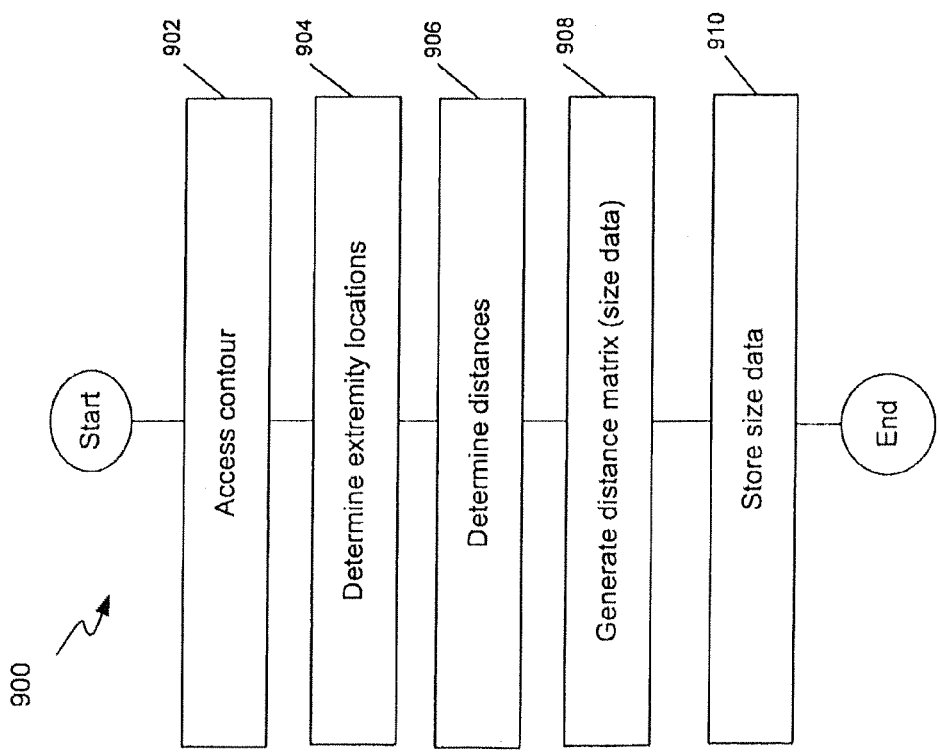
FIG. 9 is a flowchart of a feature extraction process of the image analysis process.

In the feature extraction process 900, as shown in FIG. 9, the feature extraction module 314 accesses a contour in the processed image data 406 corresponding to a processed image (step 902) and, using the contour, determines extremity locations of the animal represented by the contour (step 904), for example determining the longitudinal ends of the contour, and the maximum width of the contour at certain locations along the longitudinal length of the contour.

Using the extremity locations, the feature extraction module 314 determines distances and angles across the contour, e.g., using Matlab functions such as "duff", "fnval", "fnint", "fncmb". "fnder", and "fnbrk" (step 906), and uses the distances and angles to generate a size or distance matrix (step 908). Generating the distance matrix or the size matrix from the contour includes using system values in the parameter data 402 associated with the particular image analysis system 100, for example the relationship between pixel distances in the image (and thus the contour) and physical distances of the animal 106 as viewed by the image capture device 104.

Figure 46A:
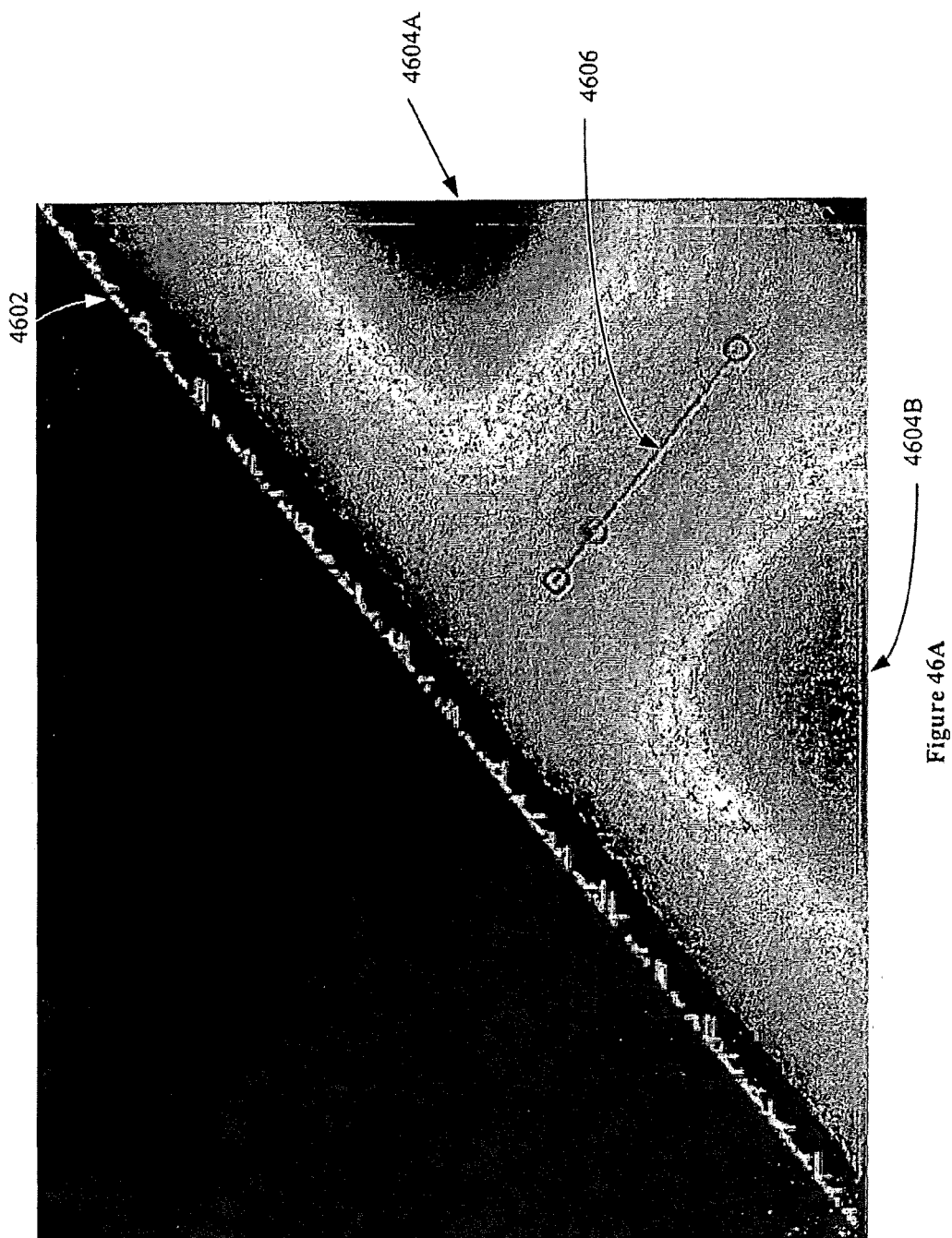
FIG. 46A is a surface representation of an example distance matrix showing a line along points of minimum distance.

The distance matrix can be a so-called Euclidian distance matrix which is an array of every distance between two points in the contour (i.e., a matrix containing every point-to-point distance along the contour). Every point-to-point distance measurement of the contour can be recorded in the two-dimensional (2D) Euclidian distance matrix. Similarly, each angle between each pair of points on the contour can be stored in a corresponding angular matrix. The distance matrix can act as a lookup table, and can be illustrated as a surface of all point-to-point distances around the boundary, and thus the animal's point-to-point body measurements, with the X and Y axes being indexed for each point around the contour and the Z value of each XY point being the distance between the points on the contour corresponding to that XY point, e.g., as shown in FIG. 46A. It is only necessary to use one half triangle of the distance matrix because the distance between two contour points would be found at two places on a foil square distance matrix.

It can be computationally efficient to store all the distances in the distance matrix because the distances between points across the boundary, or contour, may need to be accessed and compared many times during a measurement or feature extraction process, e.g., to determine the maximum widths and lengths. Similarly, the angles in the angular matrix can be used to determine angles between selected points on the contour, e.g., for determining the pose of the animal.

Specific body measurements can be determined from the distance matrix. The maximum body length (ML in FIG. 27) can be determined as the maximum in the distance matrix. To determine the widths, angular front (WFc=Width Front Curvature) and angular rear (WRc=Width Rear Curvature) widths are determined from points of maximum curvature of the contour, e.g., behind the front legs and in front of the rear legs. The curvature of the contour can be determined by dividing the contour into two halves down the line of maximum body length and these halves can be halved again so that one animal leg curve is represented by each of the four contour sections. The point of maximum curvature for each quarter contour section is determined using a standard function for radius of curvature, e.g.

$$e.g. \quad k = \frac{x'y'' - y'x''}{(x'^2 + y'^2)^{3/2}} \quad \text{[Equation 1]}$$

Figure 27:
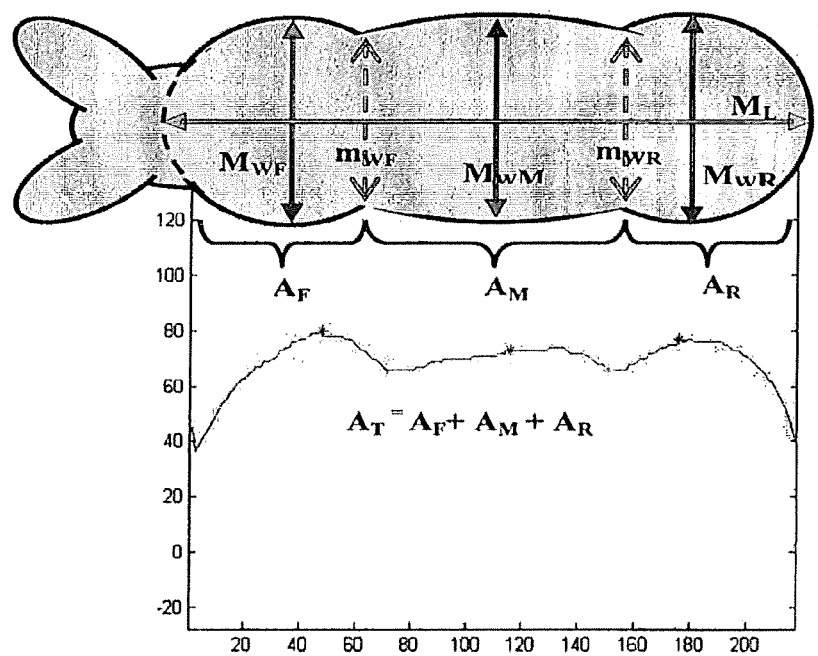
FIG. 27 is a schematic diagram of an animal contour showing longitudinal and lateral distances across the example animal contour and a slice through a distance matrix corresponding to the contour.

These curvature points are used to determine length and width measurements between the four curvature points. These point-to-point widths (WFc and WRc) are the distances between the top and bottom points of maximum curvature, and lie in close proximity to the true minimum front width (mWFa) and minimum rear width (mWRa) of the animal. Once the Euclidean Distance Matrix has been generated, it can be computationally efficient to extract a slice or two-dimensional graph of the distances between selected points around the contour. As the Euclidean Matrix has the stored values for WFc and WRc, the point position in the Matrix is used to locate a section (slice) in the matrix to search for the true mWFa and mWRa. These are found as the minimum values in each of the front and rear slices of the Euclidean Matrix. An array is then created which contains points that flow through both minimum points in the Euclidean Matrix, i.e., the points on a line running through both minima and beyond. This array is used to extract the values from the Matrix such that if the distances are extracted along this line and plotted, to generate a graph of width versus length, as shown in FIG. 27. The maximum point in the array between the two minima is the middle maximum MWMid and either side of the minima are the MWR and MWF. Although not shown on the diagram of FIG. 27, the lines from the points WFc and WRc divide the body of the animal into the three area sections: $A_F$, $A_M$ and $A_R$.

In embodiments, the front, middle and rear maximum widths (MWF, MWM, and MWR respectively) are found, and then used to find several more body measurements. The area of the total contour (AT) and several sections of the body (bounded by WFc and WRc) are determined, e.g., using standard integration functions in Matlab. The sampled measurements from the distance matrix, which may be 15 measurements, can be used as limiting parameter values when determining the integrity of the shape as well as its relationship to the desired animal body shape used for weight estimation (e.g., by comparison to values in the parameter data). A handful of these measurements can be used in a multiple-regression weight estimation equation defining an allometric relationship, as described hereinafter. The term "allometric relationship" refers to a relationship between the animal's size and its weight.

Figure 29:
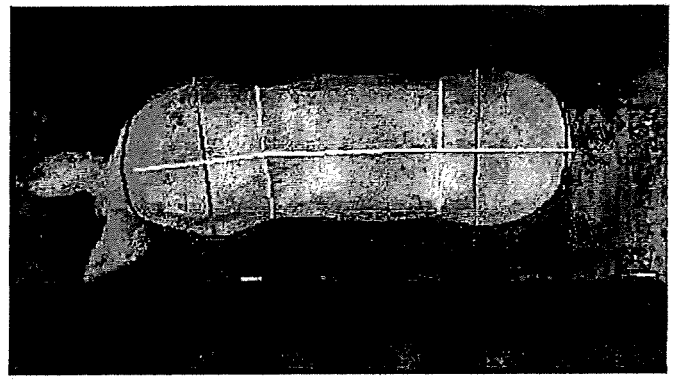
FIG. 29 is a further example image showing lateral distances across the animal body where the animal image is bent in the longitudinal direction due to a non-straight pose of the animal.

The process can include: generating orientation data representing angular orientations of the distances (e.g., as shown in FIG. 29) and generating the size data using the orientation data. Based on a deformable object the angles created by the leg movement of the animal may distort the accuracy of the system. The angles can be used in predictive equation to improve precision.

The feature extraction module 314 stores the size data in the processed image data 406 in association with the image data (step 910). Alternatively, the size data can be stored in the output values data 408.

Figure 10:
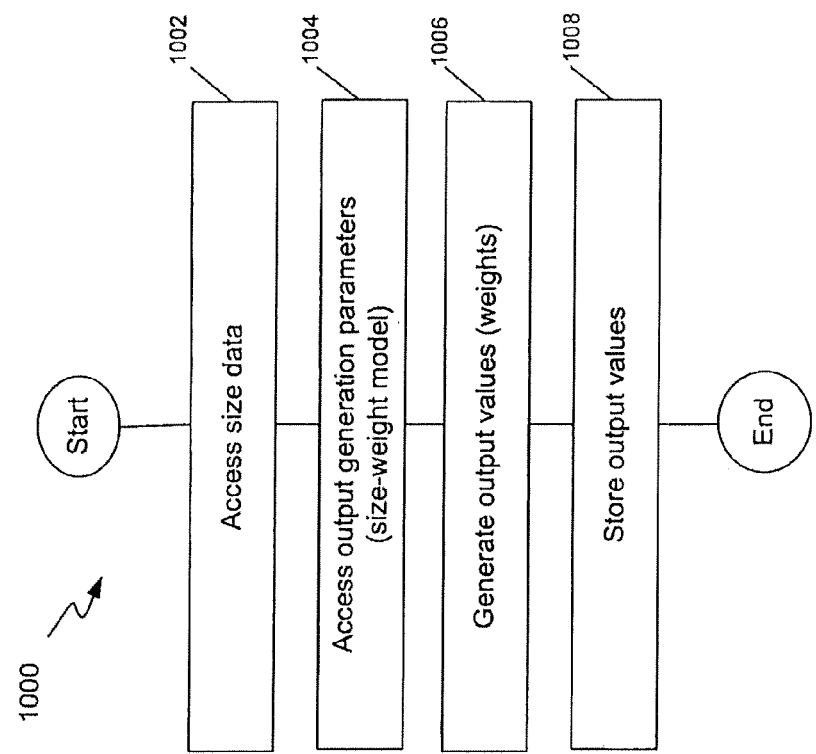
FIG. 10 is a flowchart of an output values determination process of the image analysis process.

Output Values Determination Process 1000 in the output values determination process 1000, as shown in FIG. 10, the output values determination module 316 accesses the size data generated in the feature extraction process 900 (step 1002) and accesses output generation parameters, such as allometric (or "size-to-weight") relationships (including allometric models), in the parameter data 402 (step 1004). Using the size data and the allometric relationships, the output values determination module 316 generates output values, such as weights (step 1006) and stores the output values in the output values data 408 (step 1008).

A multivariate output value prediction model, based on previous measurements on animals, can use the determined distances as inputs to generate the output values. For example, a general linear model (GLM) can be used to predict weight values from size values, as described in "GLM select procedure (experimental release)" by the SAS Institute Inc., (1989) SAS/STAT® User's Guide. In 'Version 6, Fourth Edition, Volume 2,' Cary, N.C.: SAS Institute.

Experimental Image Analysis System

An experimental embodiment of the image analysis system 100 is described hereinafter.

System

Figure 11A:
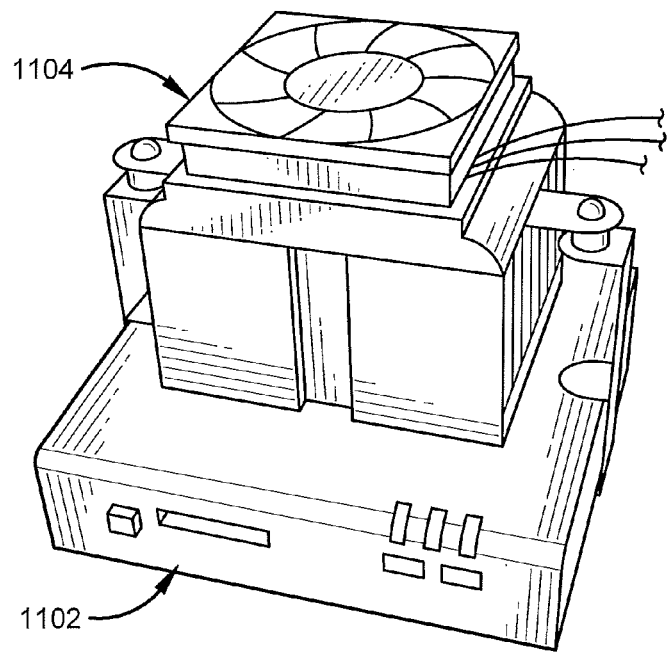
FIGS. 11A and 11B are photographs of an example computer of an example image analysis system.
Figure 11B:
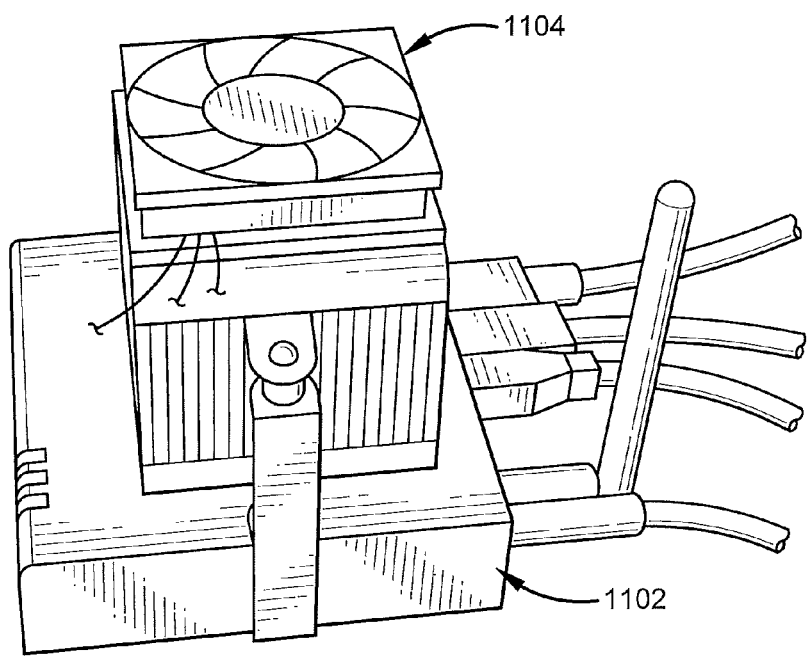

In the experimental system, a mini industrial personal computer (PC) 1102 (e.g., a FIT2PC, Compulab Limited, Technion, Israel) is used as part of the experimental computing system as shown in FIGS. 11A and 11B. The industrial PC 1102 can be relatively small, generally 10 cm by 10 cm, making it easy to use in farming environments and secure locations. Furthermore, no air forced or fan cooling is required, which is preferable for dusty environments. The sealed computer case and small size can be preferable for farm environments to provide a simple and robust experimental image analysis system. A heat sink 1104 is attached to the external case of the experimental PC 1102, as shown in FIGS. 11A and 11B, to further protect the PC 1102 in hot environments (e.g., over 30° C.) which can be common in a farm or shed.

Image processing is performed using Matlab (e.g., version 6.5.1, release 13 or newer) including the Image Processing Toolbox (e.g., version 4.1 or newer).

The experimental PC 1102 includes a remote connection to an external computing system, e.g., via the Internet, to allow login by remote users, for collection of data and checks on the operation of the experimental image analysis system. The experimental PC 1102 can be connected to the external system using a wired internet connection or a wireless internet connection.

Figure 12:
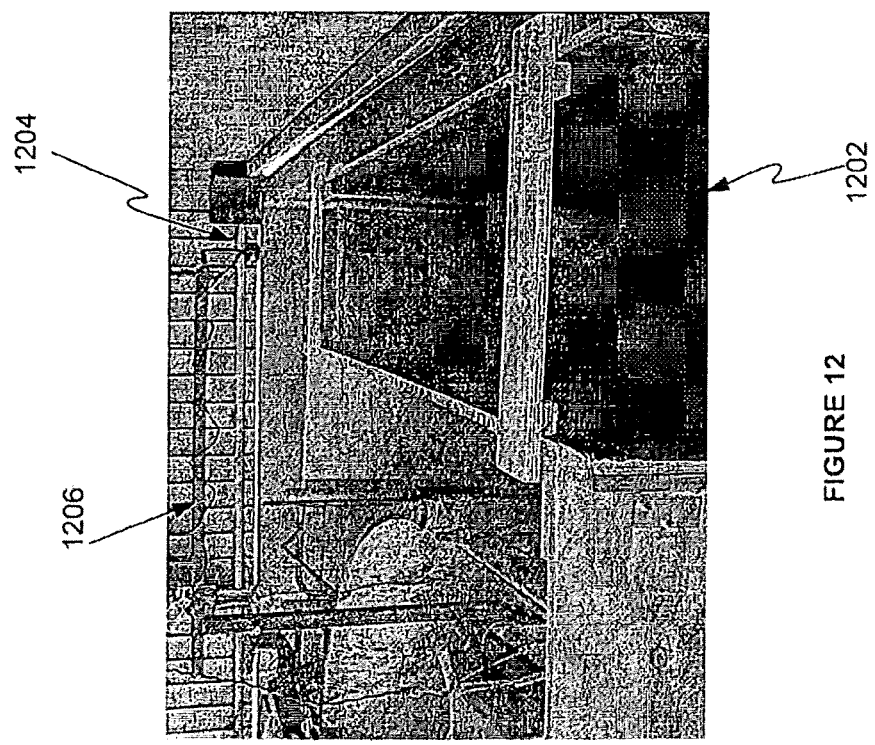
FIG. 12 is a photograph of an example walkway of the example image analysis system.
Figures 14A, 14B:
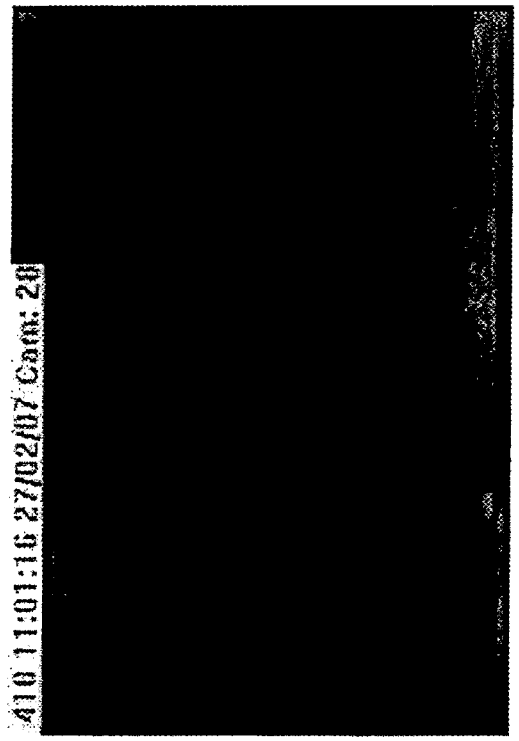
FIG. 14A is an example image in the image analysis system, including an example animal object and an example background.
FIG. 14B is a further example image in the image analysis system including only the example background.

A universal serial bus (USB) off-the-shelf web camera 1204 from Logitech (Hong Kong) is used as the image capture device 104 in the experimental system, as shown in FIG. 12. The web camera 1204 requires no frame grabber board as it already has a digital output. The web camera 1204 is powered from the PC 1102 by the USB cable, and thus requires only one cable to be insulated and protected from the environment and rodents etc. The web camera 1204 can operate with a resolution of 320 by 240 pixels and a frame rate of 30 frames per second (fps) up to a resolution of 1200 by 1600 at 5 fps, Image data is digitised in the web camera 1204 and transferred to the experimental PC 1102 using the USB port.

The web camera 1204 generates colour images with data representing three colours: red, green and blue. Each colour has a pixel array (or matrix) of intensity values for that colour. The experimental image analysis system generally uses image intensity data representing only one colour. The colour channel is selected based on the lighting conditions. For example, the selected colour channel can be chosen to include substantial intensity values for both high intensity (the animal object) and low intensity (background) image regions. In examples, this can be the green channel, or the red channel.

Figure 13:
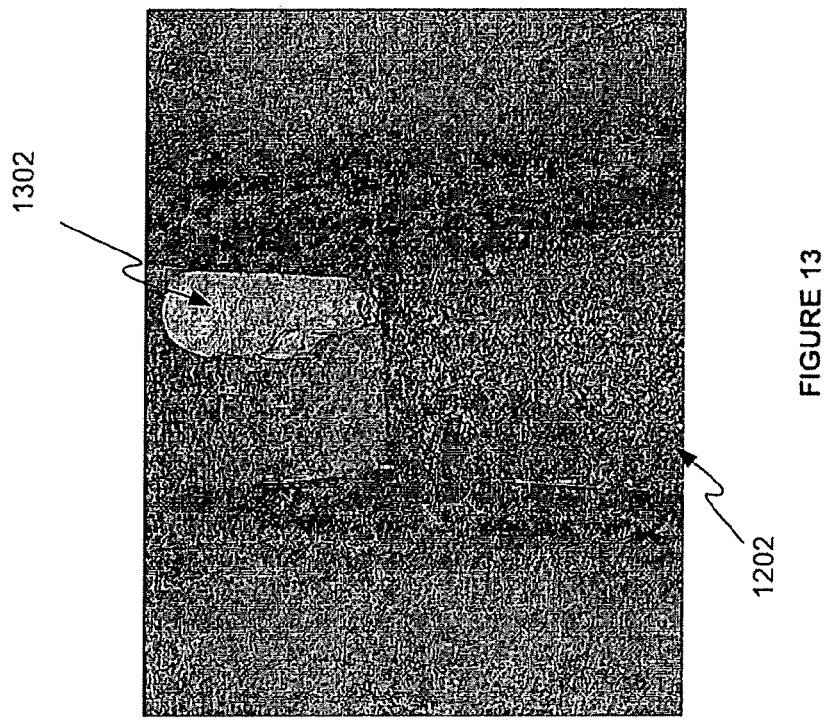
FIG. 13 is a photograph of the example walkway with an example animal.

In the experimental system, the restraints 114 include an experimental walkway 1202, as shown in FIGS. 12 and 13, configured to guide animals, and particularly pigs, along the walkway 1202.

The web camera 1204 is mounted using an experimental stand 1206 (i. e., a form of the stand structure 112) generally directly above the experimental walkway 1202, as shown in FIG. 12, thereby providing a field of view 116 that includes an animal when positioned generally in the centre of the experimental walkway 1202. The web camera 1204 is at a height of about 1.7 meters above the walkway 1202. At an average pace, an animal, e.g., a pig 1302, can take about 1 second to travel through the field of view 116 of the web camera 1204.

The animals, e.g., pigs, are not required to be stationary or at a feeder or drinker when collecting samples.

The background in the field of view 116 of the web camera 1204 includes the walkway 1202. The background is configured to provide background images in the web camera 1204 that have a different intensity to the intensity of the animal images. For example, the experimental walkway 1202 is painted in dark colours, whereas an example pig 1302 can have a light colour, as shown in FIG. 13.

The auto exposure settings on the web camera 1204 are used to account for variations in environmental lighting conditions.

The experimental system is well suited to pigs because they have a hide or skin colour that can be easily distinguished from the background under normal lighting conditions, because they can be convinced to walk through the walkway at a pace appropriate for the image capture device 104, and because there are consistent relationships between a typical pig size and its weight, in contrast to sheep and poultry, pigs do not have wool or feathers covering and obscuring their body shape. Pigs do not experience significant variations in body weight and size due to ingestion or "gut fill" (e.g., drinking and eating) in contrast to cattle which store large volumes of ruminant food and water.

Pre-Processing

As the web camera 1204 generates approximately 30 fps, and as the animal is centrally placed in the field of view 116 for only a portion of one second, only a fraction of the captured images include a substantial portion of the animal body (e.g., an entire pig body): these whole-body frames are selected by an experimental pre-processing process, and the other frames are discarded and not processed further (which would be a waste of processing). A cross-hair method can be used, by some experimental embodiments of the image preprocessing module 310, to select the whole-body frames.

Figure 15:
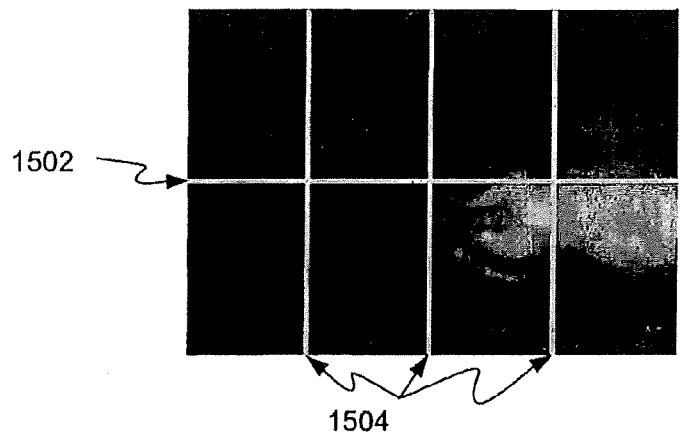
FIG. 15 is an example image showing four example position-monitoring lines across the image.
Figure 19:
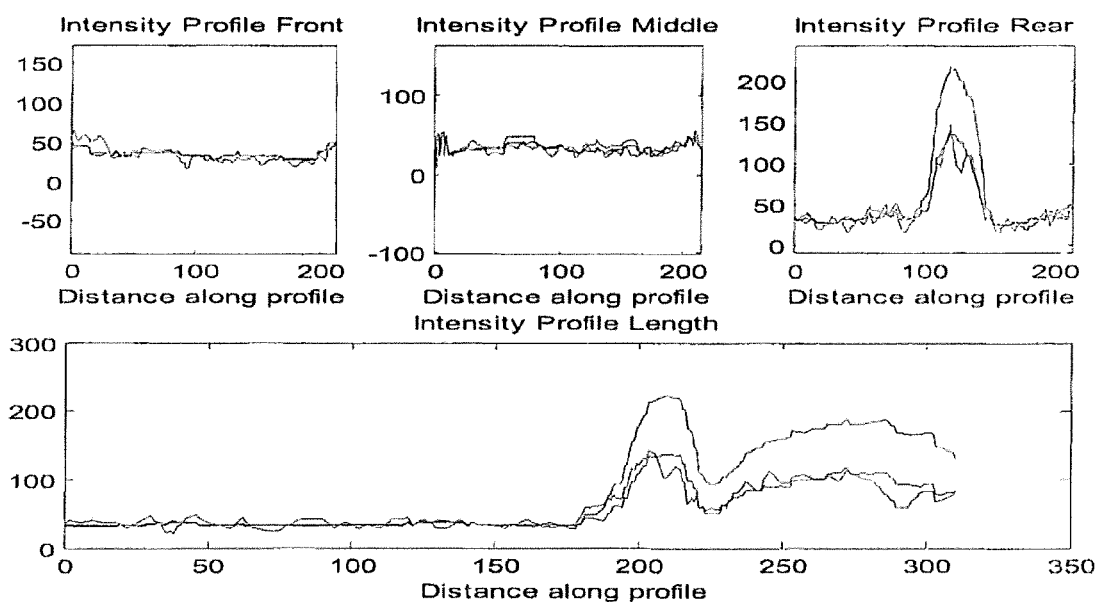
FIG. 19 is a graph of an intensity profile along the longitudinal position-monitoring line in the image of FIG. 15, showing intensities associated with the background and the animal object.

The cross-hair method uses a "targeting", or cross-hair, approach. In the cross-hair method, the image is divided into vertical and horizontal sections by generally equally spaced vertical and horizontal lines as shown in FIG. 15. These position-monitoring lines specify groups of pixels for each line in each frame. The horizontal line is a longitudinal (with respect to the animal orientation) position-monitoring line 1502 and the horizontal lines are lateral (with respect to the animal orientation) position-monitoring lines 1504. Large peaks in image intensity along any position-monitoring line represent the presence of an object in the image at that line: e.g., for the image in FIG. 15 the right hand vertical line has an intensity profile with a peak as shown in FIG. 18; the left hand and centre vertical lines have intensity profiles as shown in FIGS. 16 and 17 respectively, which are generally flat without any intensity peaks as no animal object appears crossing those lines; the central horizontal line, aligned longitudinally with the animal, has an intensity profile with a peak where the animal object appears in FIG. 15 and flat where the background appears, as shown in FIG. 19. In the cross-hair method, animal size can be determined or estimated from the intensity profiles along the position-monitoring lines. For example, the width of a peak along each line is indicative of the width of the object lying across that line or in the corresponding virtual plane. The mid-points of the width of each lateral position-monitoring line (e.g., of each vertical lines in FIG. 1 5) can be used to generate an indication of the longitudinal orientation of the animal, i. e., the orientation of the object (which can also be used to determine any bending or twisting of the animal in the image). The intensity profile along the longitudinal position-monitoring line can be used to determine whether the object is completely in the frame, and then to determine or estimate the length of the object. The length and width ratios determined from the position-monitoring lines can be used to determine whether the object has approximate dimensions corresponding to the expected animal size (based on preselected size and length limits, e.g., from previous animal measurements), and the presence of a complete image in the frame can be used to determine whether the image is suitable for further processing (in the image pre-processing process 700). The cross-hair method provides efficient monitoring of the captured frames and presence of an animal, and furthermore generates approximate data representing length, width and orientation of the animal.

In other embodiments, a modified cross-hair method can be used to determine the orientation and dimensions of the contour after the contour is found. Then the head and tail are trimmed based on this information at an angle normal to a midline of the animal's body.

Figure 31A:
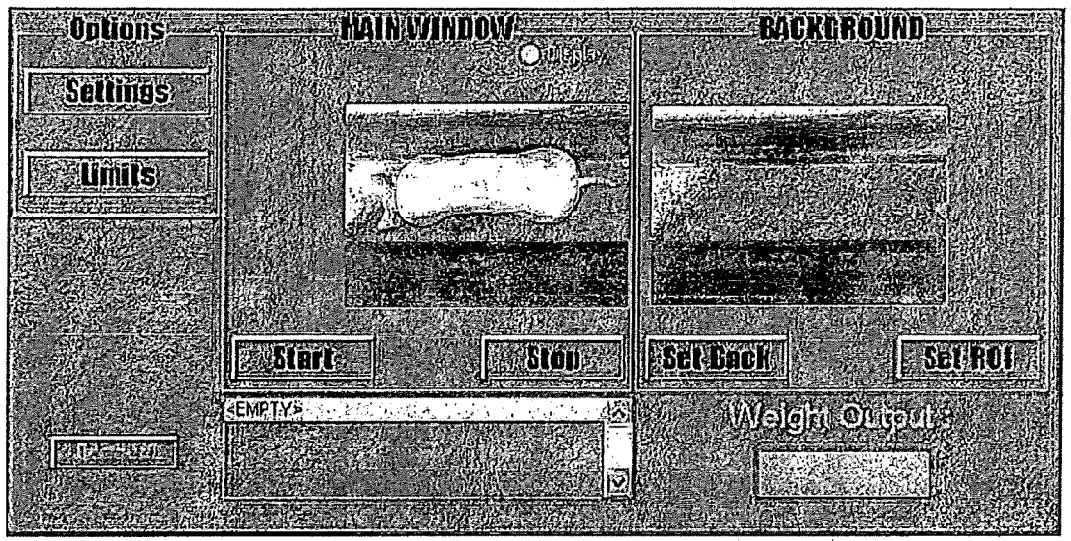
FIG. 31A is a screen shot of an example graphical user interface of the image analysis system showing an image and a contour.
Figure 31B:
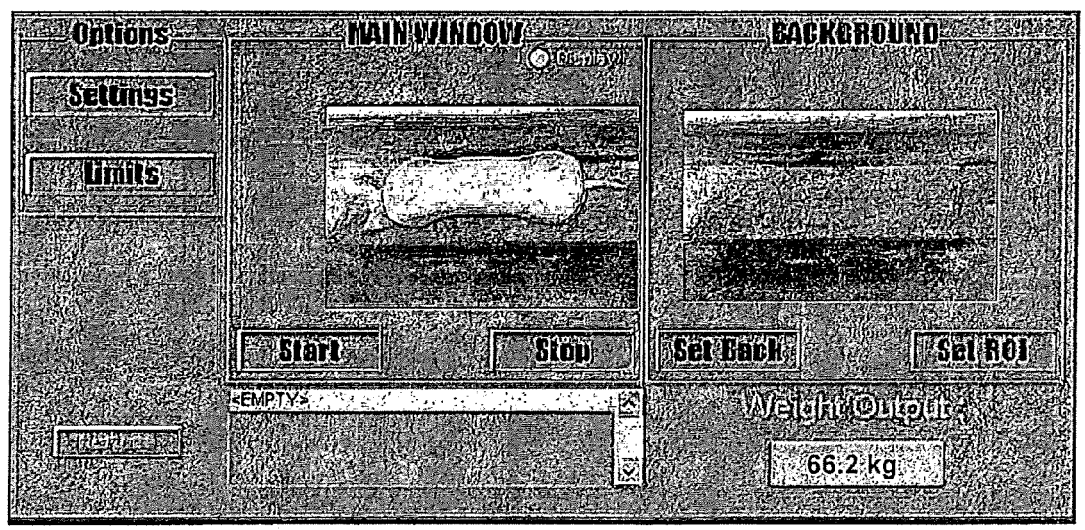
FIG. 31B is a screen shot of an example graphical user interface showing a generated weight output value.

In other embodiments, the pre-processing steps are not performed, and all captured frames are subjected to the contour detection process, as described hereinafter. Every frame is searched for a contour: if the contour width and length match expected animal size parameter values (e.g., representing pig size limits), then the measurements are extracted using the 15 measurement variables. If the 15 measures are within the pig size limits the contour is deemed a pig and weight is calculated and output along with a reference image showing the found contour, e.g., as shown in FIGS. 31A and 31B.

A median filter (e.g., 'Medfilt2' in Matlab) can be used to reduce noise in the images.

Contour Detection

Figure 20A:
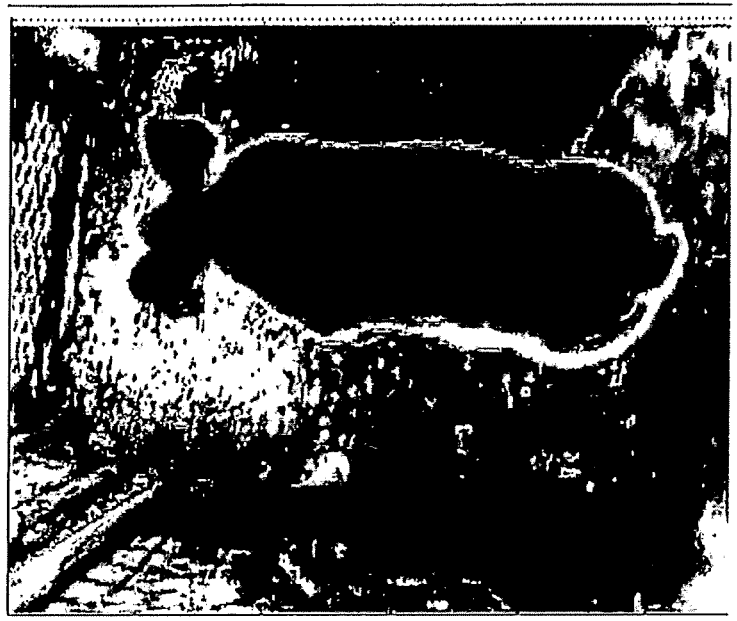
FIG. 20A is an example image showing an example animal object in an example background.

In the experimental system, the contour detection process 800 receives image data representing a whole-body image of an animal against a background of the walkway 110. e.g., as shown in FIG. 20A. The image has an intensity which differs for the animal image and the background image. For example, a pig with light coloured skin and at a different position from the walkway 1202 relative to lighting sources can have a considerably higher intensity at each image pixel than the background, for example as shown in FIG. 20B where the pig image intensity is about 80% and the background intensity is generally below about 50%.

Figure 20B:
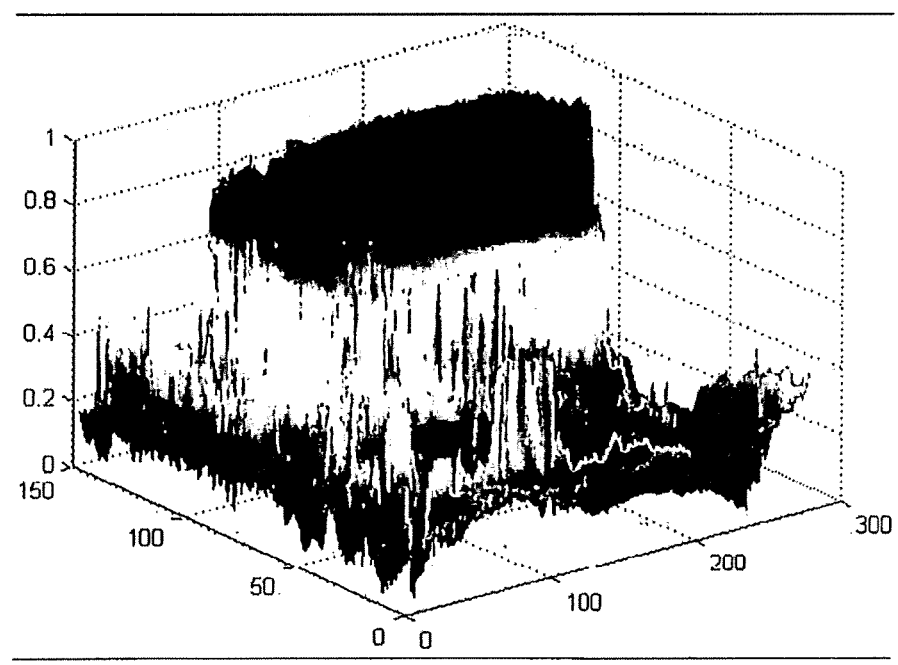
FIG. 20B is a "three dimensional" graph of the intensities of the pixels in the image of FIG. 20A.
Figure 21:
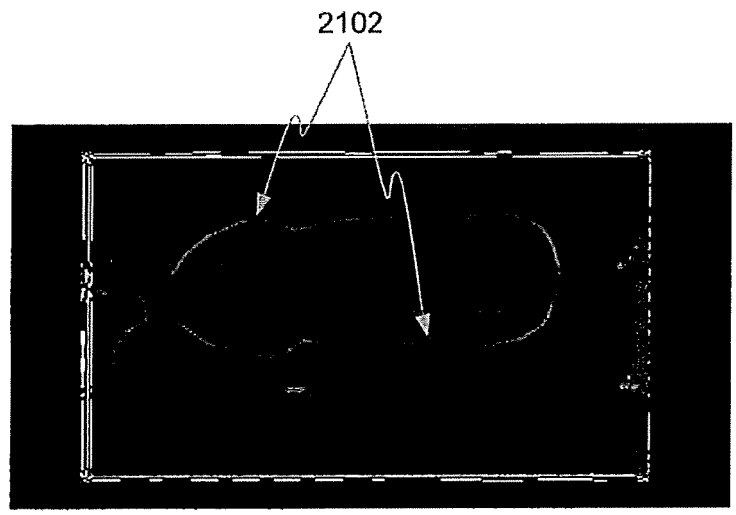
FIG. 21 is an example image showing an example boundary contour of the animal object.

The experimental contour detection process detects the contour or boundary of the animal object where the intensity gradient is high, e.g., at the edges of the high intensity region in FIG. 20B where intensity rapidly declines from about 80% (or 0.8) to less than 20% (or 0.2). This rapid decline in the intensity at the edge of the animal object is detected to detect the contour or boundary, e.g., as shown in FIG. 21 as an outline 2102 of the pig object.

In the experimental system, the search region used for locating the start points is the same as the central lateral position-monitoring lines 1504, i.e., lines that traverse a longitudinal axis of the animal image and thus appear vertically through the centre of the image in FIG. 15. The search line data can thus be used from the cross-hair method described hereinbefore. Using Matlab functions, the intensity profile along the search line is searched (or "filtered") to determine the two points of maximum intensity gradient, which lie at the edges of the animal object, as shown by example potential start points 2202 in FIG. 22. The distance between the potential start points 2202 is used to determine whether they corresponded to expected pig widths (based on the parameters of the imaging system and the expected variety of pigs).

Figure 22:
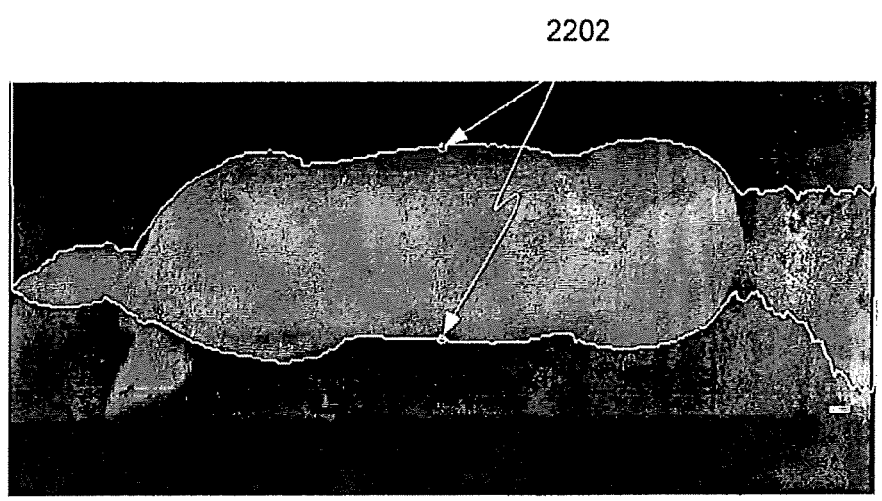
FIG. 22 is an example image showing an example detected boundary contour in four portions.

If the potential start points 2202 are spaced apart by an expected animal width, the boundary contour of the animal object is detected starting at the start points 2202 using four vertical strip filters moving along the contour of the animal towards the ends of the animal object and tracing the maximum gradient at each horizontal step along the contour. Each filter is moved incrementally along the sides (both the top and the bottom) of the pig image. The four filters are moved one increment in one loop cycle of the experimental contour detection process. The directions the four filters move are to the left and right from both the top and bottom starting points, i.e., from each start point, a first filter moves in one longitudinal direction and a second filter moves in the opposed-longitudinal direction. This single loop directs the four filters in an advantageous path whereby the randomness of the tail and head do not affect the filters path considerably until the body shape of interest is first found. The vertical strip filters continue following the contour until the edge of the image is reached forming the contour, lines that represent at least the side boundaries of the pig image, as shown in FIG. 22. Using vertical strip filters provides good contour detection along longitudinal boundaries, particularly along the sides of the animal, but fails to follow lateral boundaries, e.g., around the head and tail regions. In the experimental system, the speed of contour detection can be about 20 fps (depending on processor speed), and thus erroneous contours, identified later in the contour detection process 800, can be discarded and the image data recycled without sacrificing real-time operation.

Figure 23:
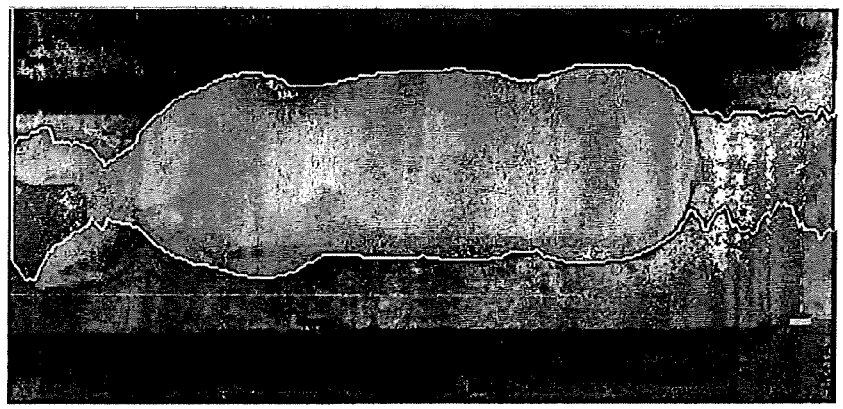
FIG. 23 is an example image showing a detected contour before trimming.
Figure 24:
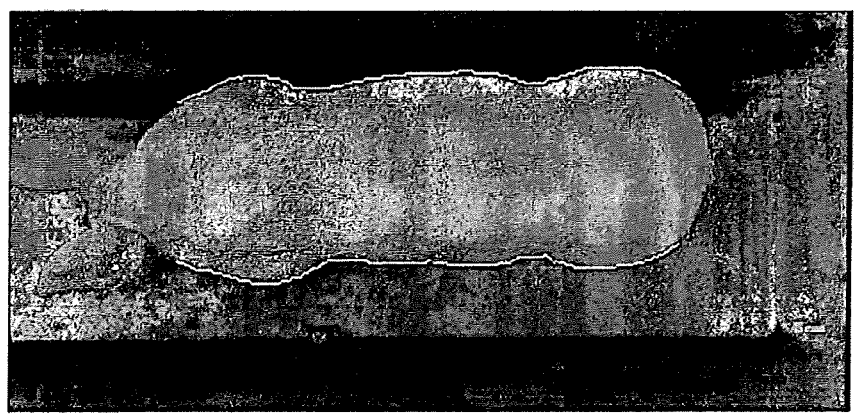
FIG. 24 is an example image including the example image of FIG. 23 with an example contour after trimming of the longitudinal ends.

In the experiment contour detection process, the end portion trimming step 816 is implemented using a trimming process in which sections of the contour at the ends of the image can be trimmed or cut based on a percentage of the width between the start points 2202. For example, portions of the contour which are closer than 80-90% of the distance between the start points 2202 in a lateral direction across the pig image are removed, as shown in FIGS. 23 (before trimming) and 24 (after trimming).

Figure 25:
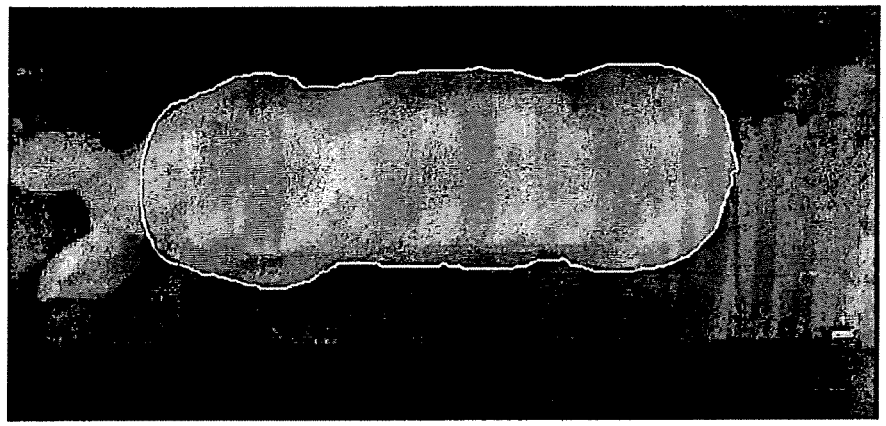
FIG. 25 is an example image including the example image of FIG. 24 with a contour including modelled end boundaries.

The complete contour generation step 818 is performed by constructing a spline curve using sampling points from the trimmed boundary or contour. The experimental complete contour includes smooth closed ends, which generally conform to the main body in the animal image excluding the head and tail features, for example as shown in FIG. 25.

Figure 26A:
FIGS. 26A and 26B are example multiple-animal images including a plurality of animal objects showing a contour detected for one example animal.
Figure 26B:

The experimental system can be used without the walkway 1202 and instead with a pig pen to generate free range images including a plurality of animal images, e.g., as shown in FIG. 26. A similar contour detection method can be used in which search lines across the image allow selection of potential start points at high image gradients, start points are selected that correspond to expected animal widths, and strip filters are used to generate contours at least along the sides of an animal object, and the longitudinal ends of the animal contour are trimmed and completed using a curve fitting process. Due the efficiency of the process for detecting start points and generating the contour, contour detection can be attempted in a plurality of iterations until a contour of an expected size is detected in an image in a free range image.

Feature Extraction

In an experimental feature extractions process the length of each pig is estimated using the maximum longitudinal length of the contour and this length is then used to separate the body into three regions of interest, namely a front region, a mid region and a rear region. Maximum and minimum width values for each region are found using the contour curve and can be represented as a graph of width versus length, e.g., as shown in FIG. 27; these values are a subset of values defined within the Distance matrix.

Values for the following size features can be determined: Maximum Length ($M_L$), Maximum Width ($M_W$), Minimum Width Front ($m_{WF}$), Minimum Width Rear ($m_{WR}$), Maximum Width Front ($M_{WF}$), Maximum Width Middle ($M_{WM}$), Maximum Width Rear ($M_{WR}$), Area Front ($A_F$), Area Middle ($A_M$), Area Rear ($A_R$) and Area Total ($A_T$).

Figure 28:
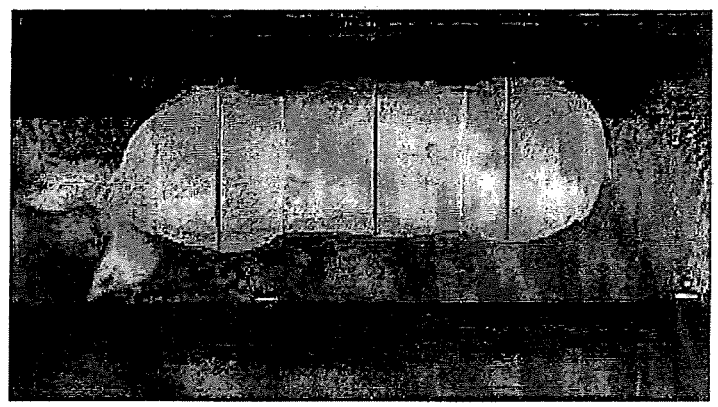
FIG. 28 is an example image of an animal with lines showing lateral distances between locations of the contour.

These measurements can be made as largely vertical measurements, as shown in FIG. 28, or as measurements taking into account the angular orientation of the animal, as shown in FIG. 29. The angular measurements can then be found using a Euclidian distance matrix. Alternatively the dimensions can be recovered from the Euclidian distance matrix directly, as described hereinafter with reference to step 3520 of FIG. 35.

Output Values

The determined distance measurements from a statistically large sample of known animals can be used to generate a descriptive model for estimating pig weight based on size, and the model can be stored as allometric rules or "relationships" in the parameter data 402. This parameter data 402 can be updated remotely in the experimental system to provide updated modelling for generation of the output values. For example, a general linear model described above can be developed by sequentially removing non-significant effects (e.g., effects with a probability less than 5%, based on a type 3 estimable function), until only significant effects remain, while ensuring all marginality requirements of a model are met (as described in "The Statistics of Linear Models: Back to Basics" by J. A. Nelder, in Statistics and Computing, 1994, Volume 4, pages 22 1 to 234).

Figure 30:
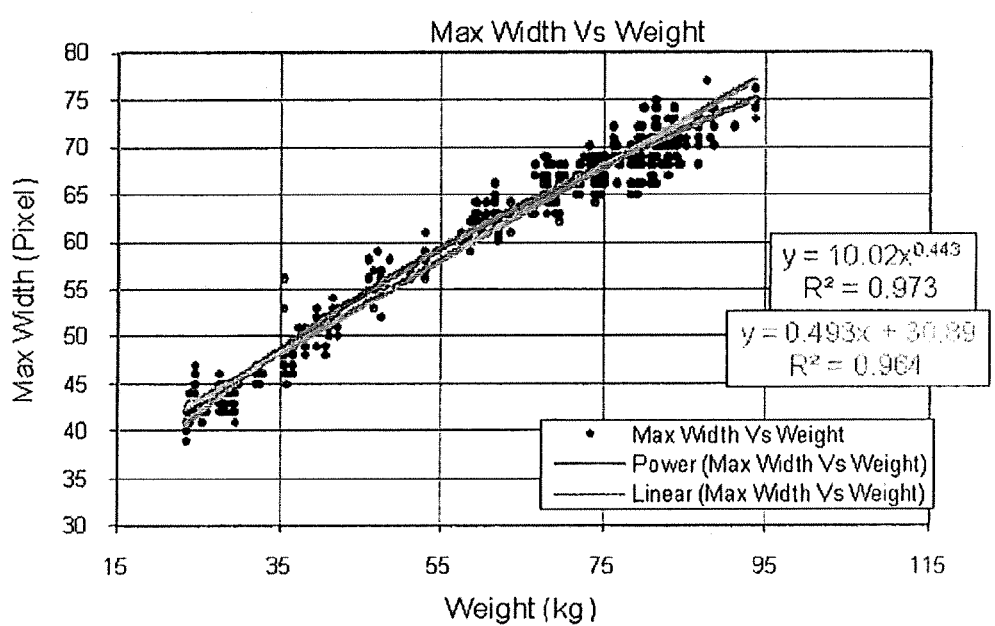
FIG. 30 is a graph of weight models which associate size values with weight values.

In an example statistical model 3000 as shown in FIG. 30, estimated weights are generated based on maximum width of the pig image using either a linear relationship (y=0.493x+ 30.89) or a power relationship (y=10.02x$^{0.443}$). The linear relationship and the power relationship, as shown in FIG. 30, are approximate models of an allometric relationship represented by measurements indicated as dots in FIG. 30.

Graphical User Interface (GUI)

Figure 31C:
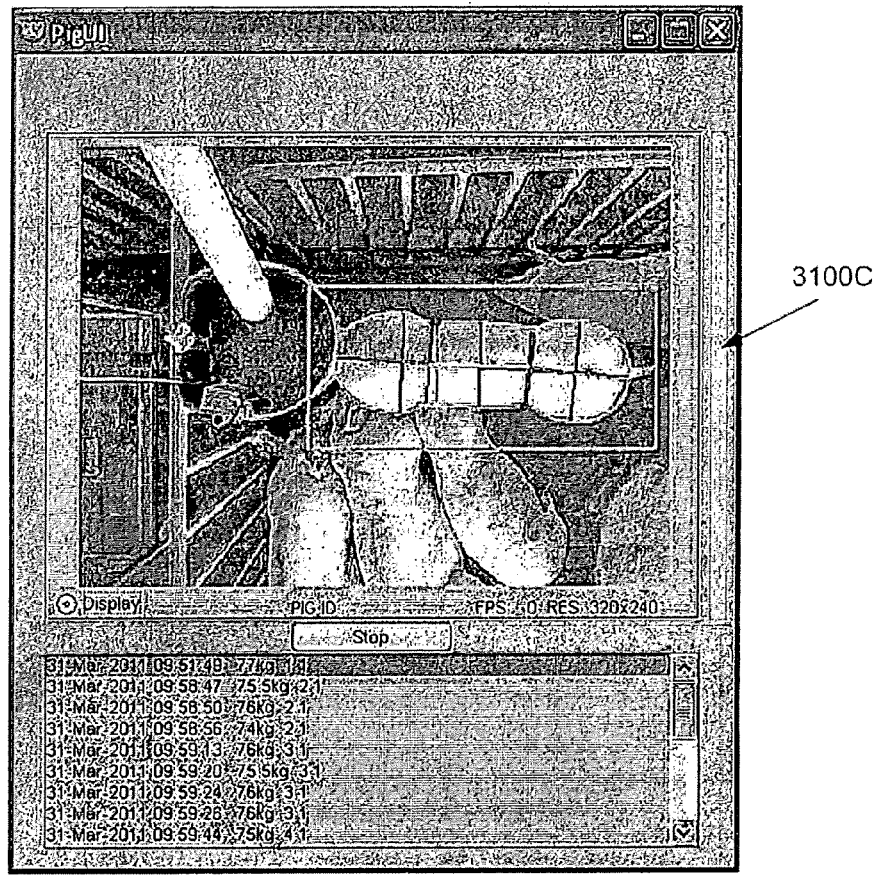
FIG. 31C is a screen shot of an example graphical user interface showing a status bar for the level of correlation of a sample contour to a template contour.
Figure 31D:
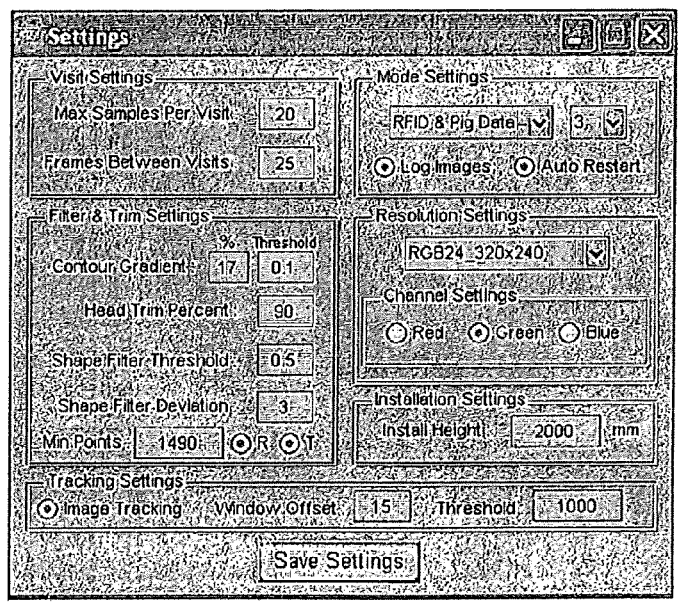
FIG. 31D is a screen shot of an example graphical user interface showing selection of user-defined settings used in the analysis process.
Figure 31E:
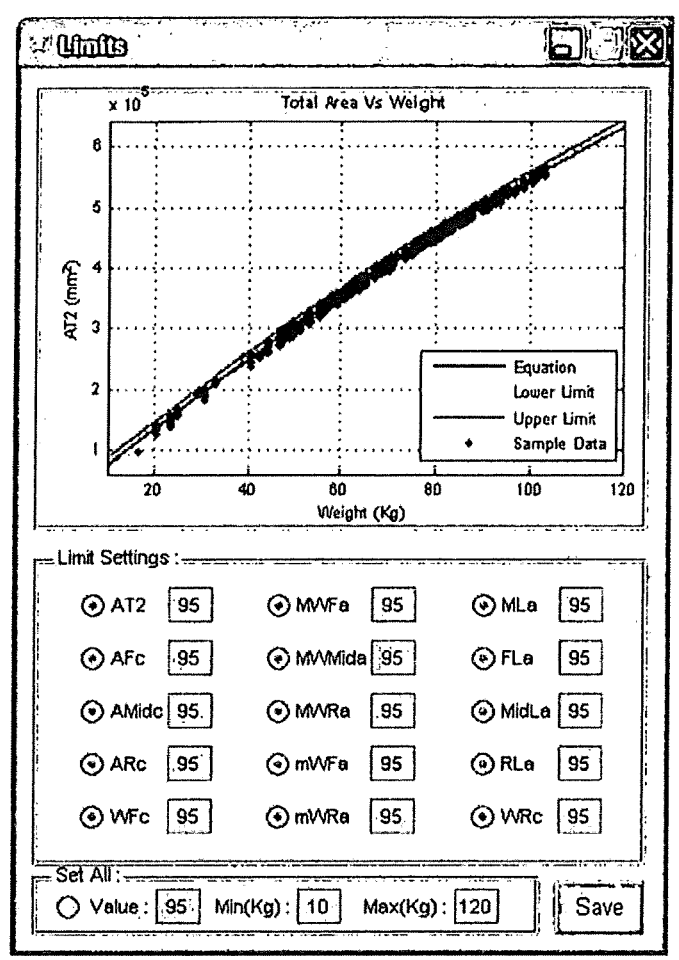
FIG. 31E is a screen shot of an example graphical user interface showing selected parameter values for estimating weight from contour area.

The experimental system includes a graphical user interface to allow a user to easily and automatically execute image capture, edge and contour detection, feature extraction and recordal of processed image and weight outputs, for example as shown in FIGS. 31A and 31B, or as shown in FIGS. 31C to 31E.

Figure 32A:
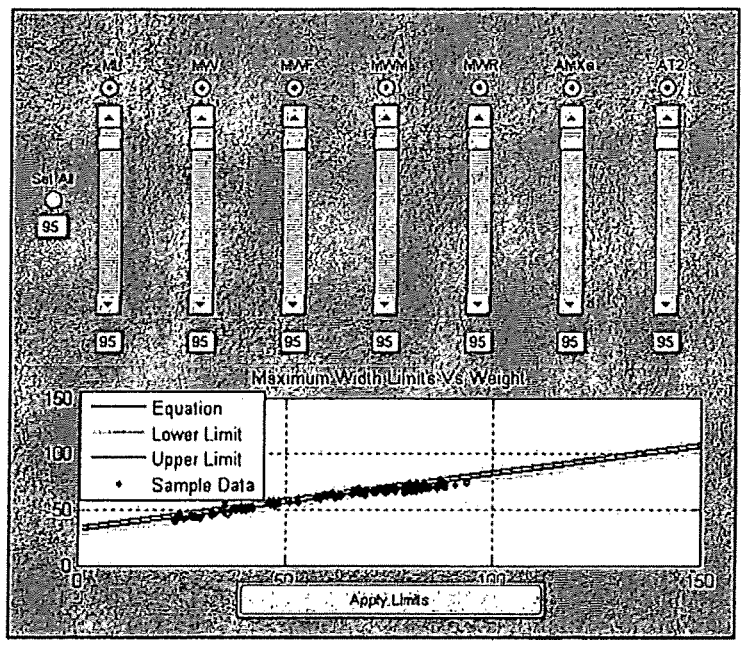
FIG. 32A is a screen shot of a graphical user interface showing input controls for entering parameter values and a weight model associating size values with weight values.
Figure 32B:
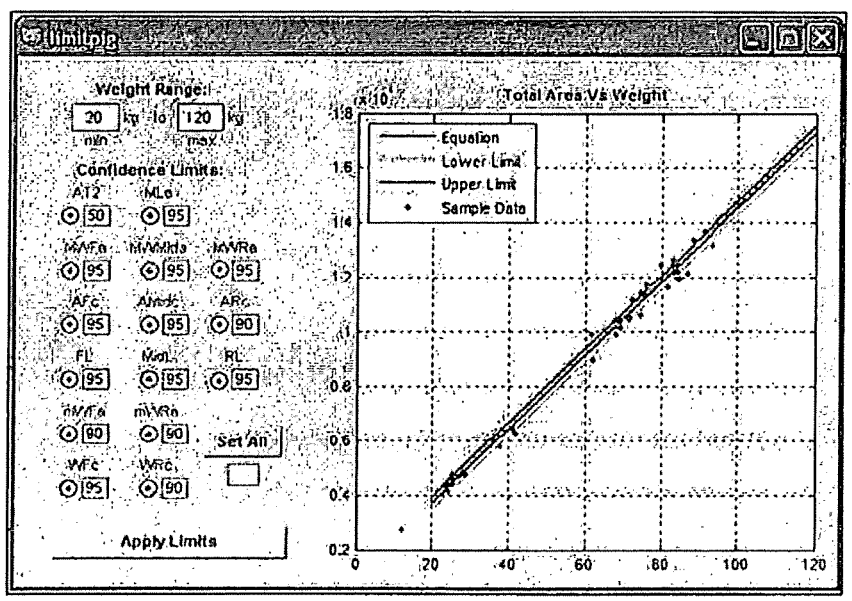
FIG. 32B is a screen shot of the graphical user interface showing an alternative screen to the screen shot in FIG. 32A, including an input control for selecting a weight range value for an acceptable weight parameter.

The GUI includes an input interface to assist with valid weight prediction by setting the parameter values associated with expected animal dimensions. The GUI receives data relating to the sizes and distances described above with reference to the feature extraction process 900 as shown in FIGS. 32A and 32B, for example, "$M_L$" corresponds to the maximum length described above with reference to FIG. 27. The parameters generated using data from the input GUI can be represented by a lookup table (LUT) which contains upper body measurements which are used to limit the shapes of potential contours detectable in the image to be within expected peak dimensions for the predicted weight: when an output weight is generated, this value is cross-referenced with the generated size information in the LUT and if the measurements are not within the selected parameter value limits, this frame is rejected. The limit on possible values as a relationship between total image area inside the contour and estimated weight can be shown on a graph with one line indicating a lower limit and a second line indicating an upper limit on acceptable values, as shown in FIGS. 32A and 32B.

The 'limits' procedure is linked to data representing know dimensional ranges of the animal at given weight ranges. It is not difficult for the user to introduce new measurement data into the limits data. The user can manipulate the severity with which processed images are included or excluded by changing the confidence limits for each individual measurement. e.g., as shown in FIGS. 31E and 32B. The user saves the constraints to his or her desired level and in doing so creates the LUT that is composed of the upper and lower confidence limits for every selected measurement with respect to a given weight. The LUT is used in the in-the-loop processing to filter out unwanted results by excluding weight outputs that are composed of measurements that do not reside within the set limit range. This LUT is represented in the parameter data 402 and is used in addition to the earlier suitability tests, e.g., in the imaging pre-processing process 700, to remove output values which appear to be incorrect.

Example Experimental Farm Trials

Figure 33:
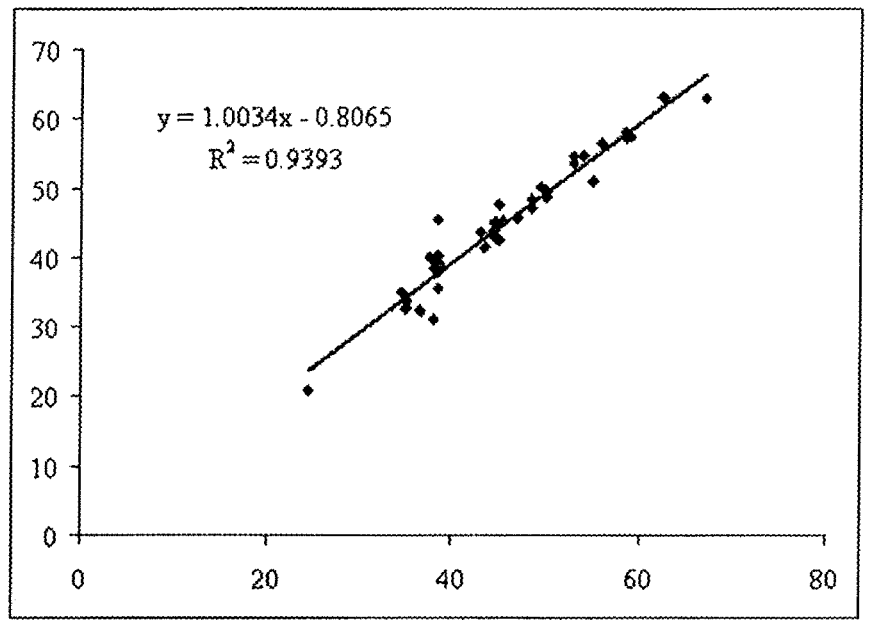
FIG. 33 is a graph showing results from a first farm trial, including a correlation between generated weights and actual weights from a weight balance.

A first experimental farm trial yielded results, with a good correlation between weight of an individual animal determined with the image analysis system 100 and a traditional mass balance, as shown by the graph in FIG. 33.

Figure 34:
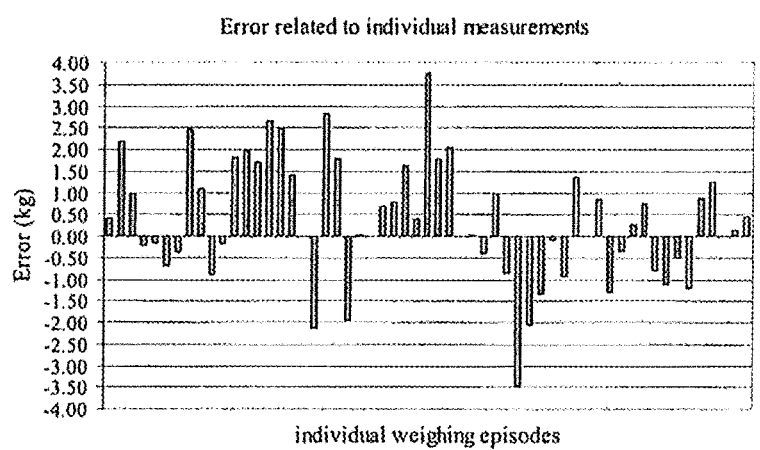
FIG. 34 is a chart showing weight errors in individual measurements in a second farm trial.

A second experimental farm trial yielded results with an average weight error of about 1.18 kg during the whole trial; a minimum error of about 0.02 kg for the best prediction and a maximum error as high as 3.76 kg for the worst prediction, as shown in the chart of individual weighing episodes in FIG. 34. The average precision is approaching about ±1 kg.

Example Image Analysis Process 3500

Figure 35:
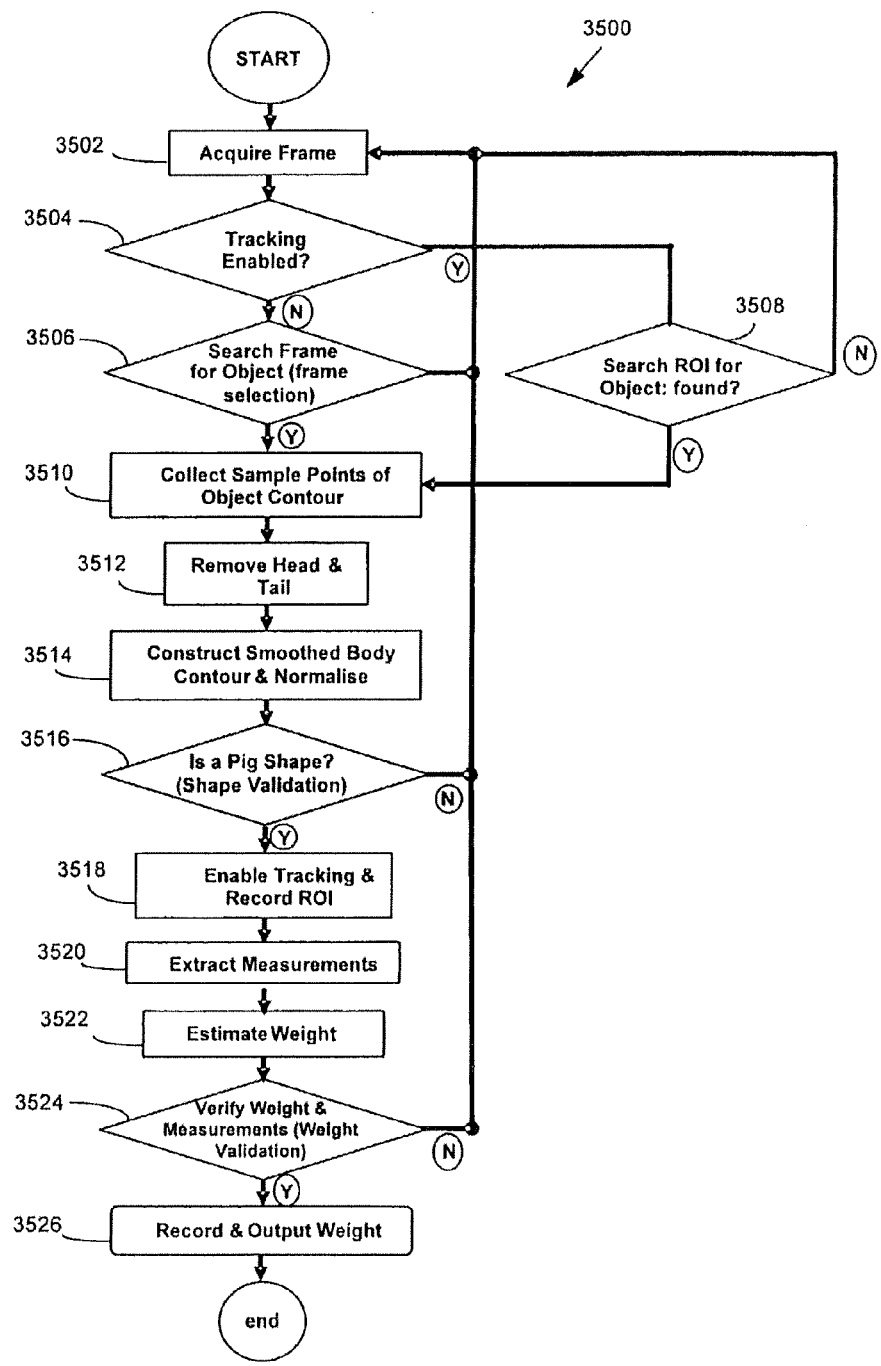
FIG. 35 is a flow diagram of an example image analysis process.
Figure 36:
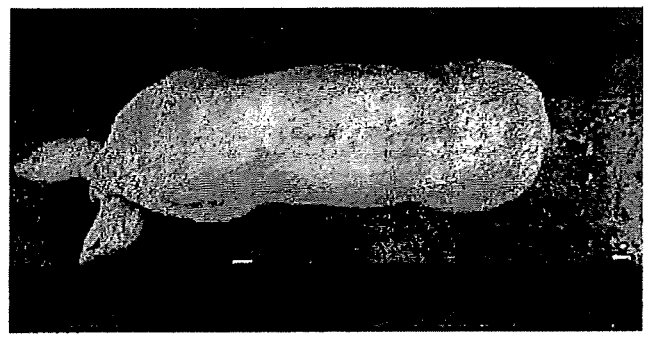
FIG. 36 is an example original image of a pig.

An example image analysis process 3500, as shown in FIG. 35, commences with images (or frames) being acquired using Fit2PC and a Logitech web camera (step 3502). Standard functions in Matlab's image acquisition toolbox are used to perform the acquisition of the image. An example representation of an image of a pig captured in step 3502 is shown in FIG. 36.

After acquiring a frame, the system 100 determines whether tracking is enabled (step 3504). Tracking is enabled in a step 3518 (described hereinafter) if a shape validation step 3516 (described hereinafter) has indicated that a previous sample contour generally corresponds to (or fits) a template contour, even if the level of fit is not sufficiently high (i.e., the confidence is below a selected threshold) for the sample contour to be used for size and/or weight analysis. If the sample corresponds to a template at some level, it is likely that an animal is present in the image frame, and close to the desirable pose, hence the system 100 tracks the animal in the hope of capturing an image with the animal in a better pose (e.g., standing with the head and body straight, and. legs down). When tracking is enabled, as determined in step 3504, the sample contour information from a previous frame is used to select a portion of the current frame. The portion can be a rectangular region of the current frame surrounding the location identified in the previous frame where the high correlating contour was found. This rectangular region is referred to as a Region of Interest (ROI). By searching the ROI for the object (in step 3508), rather than the whole frame as in step 3506, the effects of surrounding objects interfering with the search algorithm and the animal in the image space can be minimised, and processing speed can be enhanced (as there is less image space to search for contour points).

Figure 37:
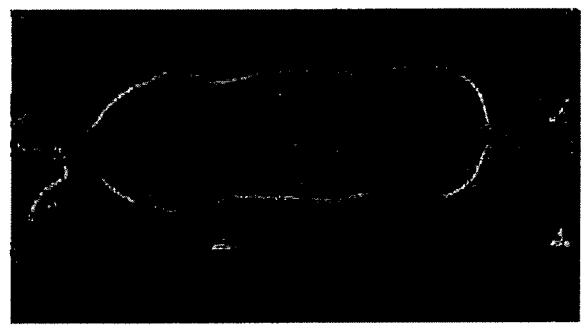
FIG. 37 is an example image gradient corresponding to the example original image.
Figure 38:
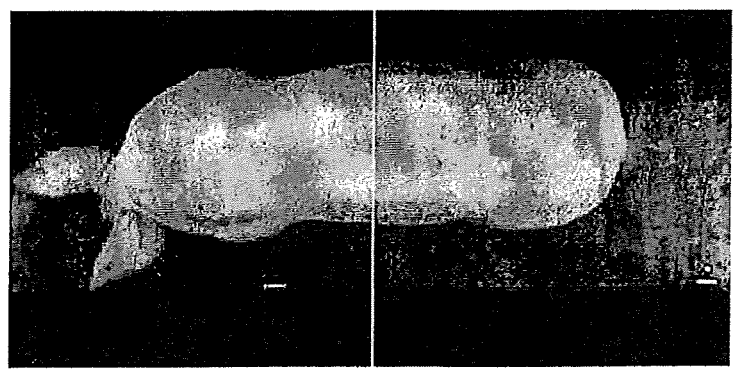
FIG. 38 is an image including the example original image and a line across the mid portion of the pig.

Once the frame or region of interest (ROI) has been selected in 3504, the system 100 searches for the object in the frame or ROI (step 3506 or 3508). The system 100 uses the image gradient, an example of which is shown in FIG. 37, to locate the object boundary or contour. The image gradient gives information about any edges located in the image. The system 100 extracts the image intensity values along of a midline in the image that runs perpendicular to the length of the animal, e.g., as shown in FIG. 38. The gradient of the image is calculated along this section (e.g., as shown in FIG. 39) and two starting edge points (e.g., 3902A and 3902B in FIG. 39) are selected on either side of the animal.

Figure 41:
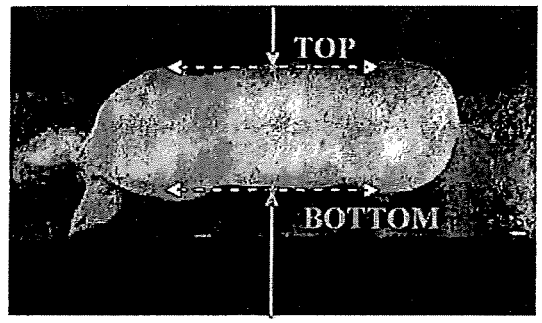
FIG. 41 is the original image of the pig with unbroken arrows showing the top and bottom start points, and broken arrows showing the directions followed by of the filters.
Figure 42:
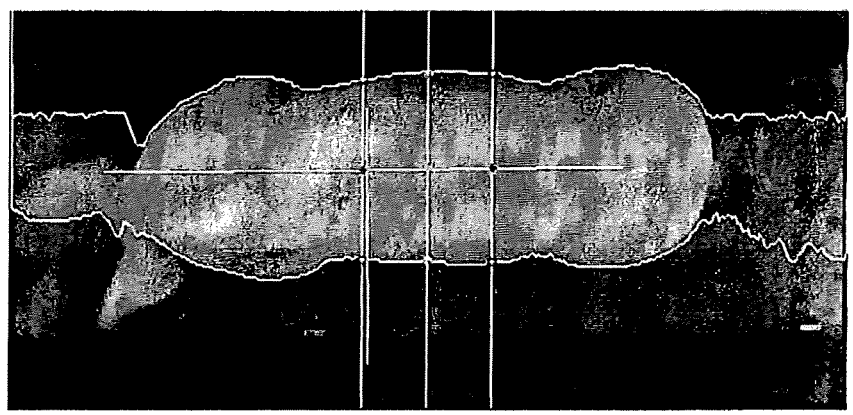
FIG. 42 is the original image of the pig with lines showing a determined angle of the animal for trimming.

Using the two starting points, the system 100 then collects sample points along the object contour (step 3510) using four filters: two filters start at the 'TOP' starting point, and two start at the 'BOTTOM' starting point, and each pair of filters progresses in opposite directions, e.g., as shown by the broken arrows in FIG. 41. A local search is performed based on the location of these points whereby four separate neighbourhood filters are located at these start points (two on the top and two on the bottom) are moved incrementally towards the left and right borders of the image. The filters are constrained within the search area bounded by the size of image and size of the filter to prevent indexing errors. As the filters increment, the pixels contained in their bounds are assessed for the absolute maximum gradient. The location of the maximum gradient within these bounds becomes the centre of the filter's next search area and a point on the resulting contour. Each filter is continuously incremented outwards by one column sequentially and in different directions. A filter example (7×1 green) and its movements with respect to the edge gradient are shown in FIGS. 40A and 40B; at the starting point in column 'A' (corresponding to stage 'A'), column 'B' is searched for the location of the maximum gradient using the same position, as the filter in stage 'A'; for the gradient associated with the example in FIG. 40A, the maximum gradient point in stage 'B' is identified as one point below the existing maximum gradient point at stage 'A'. The filter is then moved down one space for stage 'C' and the movement from the starting point 'A' and the maximum gradient co-ordinate is recorded for stage 'B' in an image or graph file, e.g., as shown in the corresponding pixel table in FIG. 40B. The filters move incrementally in this fashion until the edges of the image are reached. Each filter can be set to different size or shape, while still working in the same manner, as long as it is incremented through the image.

After the contour is located, it is trimmed (step 3512) to ensure that the variance caused by the movement of the animal's head and/or tail does not impact the dimensional measurements of the body. This is done using a shift of the elements of the TOP and BOT array of the obtained contour. Initially six points are investigated within the TOP and BOT array. Two of these points are the starting points previously discovered, the other two pairs are found by indexing the four TOP and BOTTOM arrays of the contour by a set distance of pixels from the central location. The set pixel distance can be any value which will be within the image bounds but still maintain a likely position on the pig located at the images centre. These three pairs of points are used to determine at the slope of a line using a least squares approach (e.g., shown as a central line along the pig image). The slope indicates the angular orientation of the animal from the horizontal and gives grounds to perform a trim on the TOP and BOT arrays. Trimming of the contour is performed perpendicular to the main axis of the animal by shifting and then cropping the TOP and BOT arrays a pixel distance proportional to the 'run' of the derived slope.

As the contour is open-ended after trimming in step 3512, it needs to be closed to provide a smooth and continuous shape. This is done by introducing a curve (half-ellipse) to the endpoints of the trim points at either end of the animal (step 3514). Two radii (radf=radius front and radr=radius rear) are derived based on half the distance between the trim points at either end of the contour. Two mid-points are found also to indicate the centre position of the half ellipse. Two arrays are made between 0 and pi radians containing radf and radr number of points. These points are used in sin and cos trigonometric functions to create the x and y co-ordinates of the resulting half ellipse and estimate the arc at either end of the animal. For example, the ellipse can be 2 to 5, i.e. for every 2 X/horizontal steps there are 5 Y/vertical steps forming the deformation from a circle.

To determine the X and Y point at one end of the incomplete and trimmed contour, the following relations are used:

Radius: $radf=\text{round}(\text{sqrt}((BOT(1,1)-TOP(1,1))^2+(BOT(2,1)-TOP(2,1))^2))$;

Midpoint (Ellipse centre $X$ co-ordinate): $xf=TOP(1,1)+(BOT(1,1)-TOP(1,1))/2$;

Midpoint (Ellipse centre $Y$ co-ordinate depends on if the slope of the animal is positive or negative):

If slope negative $yf=TOP(2,1)+(BOT(2,1)-TOP(2,1))/2$;

If slope positive $yf=(BOT(2,1)+(TOP(2,1)-BOT(2,1))/2$; and

Array of values (0 to pi with $radf$ points): $AFRONT=\text{linspace}(0,-pi,radf)$.

The X and Y array of points for the ellipse are generated using the 2-to-5 ratio between X and Y on the radius. The values xf and yf centre the XF and YF co-ordinates at the midpoint between the TOP and Bottom contour end points as follows:

$XF=(radf/2)*\cos(AFRONT)+xf$; and $YF=(radf/5)*\sin(AFRONT)+yf$.

These steps generate an ellipse with its main width aligned parallel with the horizontal plane, however the animals is orientated on an angle. The shift amount applied in the trimming operation called DELTA needs to be factored in, the half-ellipse need to be rotated or its co-ordinates offset such that it is aligned appropriately with the TOP and BOT contours of the animal's sides. As the midpoint is half way between the end TOP and BOT coordinates, only half the DELTA shift is used to offset the co-ordinates to complete the contour in the following fashion:

YF=YF+(linspace(−1,1,length(YF))).*(DELTA/2);

The two half ellipses are then concatenated to the TOP and BOT arrays to completely enclose the shape.

Figure 43:
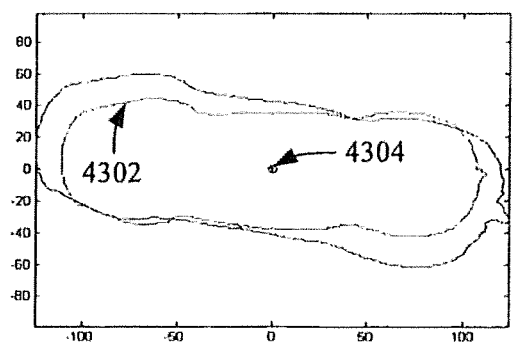
FIG. 43 is an image of a sample contour and a template contour.
Figure 44A:
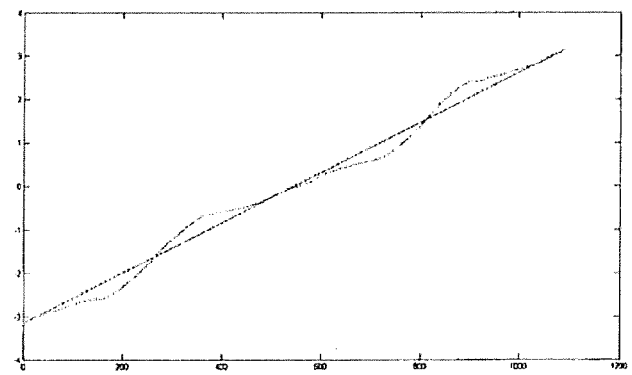
FIG. 44A is a graph of a polar angle vector of the template contour.
Figure 44B:
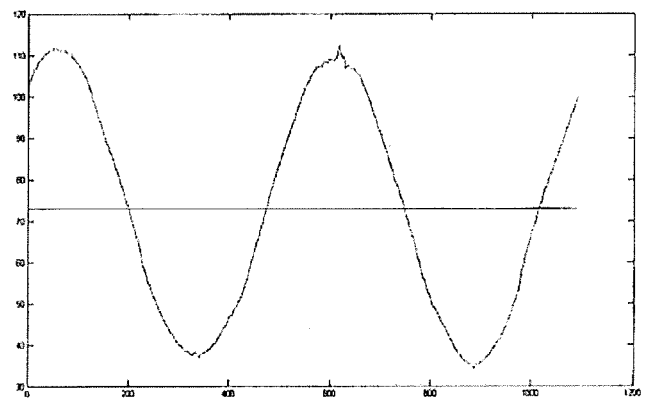
FIG. 44B is a graph of a polar magnitude vector of the template contour.

At this point the contour still may be affected by fluctuations caused by the filter in the detection of the gradient. To overcome any erroneous measurements, a spline curve is fitted to a sample of the original points to remove or smooth out any outlying points, e.g., giving a coupled smoothed sample contour as shown in FIG. 25 (step 3514). After the smoothing, the X and Y coordinates of the contour are recovered to normalise the contour. Normalising the contour enables a shape comparison between the sample, contour and a plurality of template contours regardless of the size or orientation of the animal in the sample image. The mean X and Y coordinates are taken as the contour shape's geometric centre. For example, an example contour 4302 (corresponding to the image in FIG. 36) has a geometric centre or centroid 4304, as shown in FIG. 43. Using the centroid 4304 of the contour 4302, the X and Y (Cartesian) points which made up the contour 4302 are converted into polar coordinates representing angle (e.g., vector THETA in FIG. 44A) and magnitude (e.g., vector RHO in FIG. 44B). The contour 4302 is normalised by dividing the magnitude vector RHO by the maximum value in RHO. The RHO and THETA vector are then extrapolated to generate a sample vector with a number of points (e.g., 1000, 1500 or 2000) corresponding to a number of points in the corresponding prescribed templates. The RHO and THETA vectors can be used to define the shape and subsequent pose of the animal. In general, sample magnitude contours of the same animal imaged under the same conditions have various similarities (e.g., regardless of animal pose or location in a particular sample frame).

A template or reference contour is used to validate the normalised contour (i.e., that the sample contour corresponds to a prescribed animal shape) in a template-based shape validation step (step 3516).

The template-based shape validation process in step 3516 can be included in the computer-implemented image analysis process 500 to improve the accuracy of size measurements, and to reduce computational load, by only extracting measurements from contours that are determined to be valid when compared to one or more previously determined template contours for the animals (e.g., pigs of particular shapes). The shape validation process includes receiving boundary data, representing a plurality of sample boundaries around an animal in respective images, selecting valid boundaries by selecting each sample boundary that matches a template boundary corresponding to an expected animal shape, generating distance data representing distances between boundary locations on each valid boundary, and generating measurement data, representing a size of the animal for each valid boundary using the distances. Selecting the valid boundaries includes generating a matching metric for each sample boundary and the template boundary and selecting sample boundaries with a matching metric, above a selected matching threshold. The matching metric includes a convolution value between the sample boundary and the template boundary. The matching threshold requires a selected fraction of the sample boundary to lie within a selected deviation of the template boundary. Generating the matching metric includes comparing magnitudes and/or angles of the sample boundary and the template boundary in polar coordinates.

The template contours are generated from animals in a desired pose, e.g., the head and body straight with the legs straight down. Two vectors (RHOb and THETAb) representing each template are generated in the same procedure as steps 3510, 3512 and 3514. These two template vectors are used to validate new contours. A convolution between the template RHOb vector and the sample RHO vector reveals a relationship between the two. In a convolution, the template vector RHOb remains stationary, and the sample vector values are overlayed recursively, shifted point-by-point, and the difference is recorded. The minimum absolute variance between the template vector and sample vector is identified between all comparisons. The minimum absolute variance found across all comparisons corresponds to the template and sample contours being in best alignment. The THETAb and THETA vectors are also convolved; however, as the angle vectors do not start at the same angle, a scalar adjustment is used to align the sample THETA vector with the THETAb vector. The convolution-based comparison between the magnitude, and the angle vectors is repeated for a plurality of template vectors in a database (e.g., using 1100 contour templates corresponding to various sized pigs in the range of 12 kilograms to 110 kilograms). The best match of the sample to each template is recorded as a residual value, or "residual". This residual value indicates how well the sample shape matches the corresponding template.

The sample contour can be considered to match a template contour if the residual value for a prescribed number of points is within an acceptable range. The acceptable range can be based on a selected number of deviations, e.g., 1, 2, 3, 4, or 5 deviations (a level of 3 deviations is used in the example process 3500). A threshold value can then dictate whether it is a pass or fail, i.e., whether the sample does or does not match the template. For example, the system 100 can be set to have a threshold value of 1489/1 500, meaning that 99.26% of the 1500 points of the incident shape must be within 3 deviations of the template shape filter to pass to the next stage.

The GUI, described above with reference to FIGS. 31A to 31E, can include a status bar 3100C that indicates the level of correlation between the sample contour and the template contour, as shown in FIG. 31C. The status bar can also indicate when the level of correlation reaches the threshold value, e.g., by changing colour from a neutral or negative colour (such as grey or red) to a positive colour (such as green or blue).

The shape validation process also provides data for the tracking process. The region of interest is selected in the image based on a sample boundary that at least partially matches the template boundary. A partial match is determined based the matching metric and a selected partial matching threshold.

If the contour shape is validated in step 3516, the system 100 extracts animal measurement from the contour data (step 3520). This can be performed using the feature extraction process 900, or the following alternative extraction process. In the alternative extraction process, a line which parts the minimum distances along the animal's body length in the distance matrix is determined without using the WFc and WRc measurements (curvature points behind the animal's front leg and in front of their hind legs) which are used in the feature extraction process 900. The alternative extraction process may be more accurate as the WFc and WRc measurement points are subject to variance as the animal moves. The alternative process instead uses characteristics of the distance matrix to recover the line. In particular, alternative process extracts animal size features using the boundary by detecting a reference line between two peaks of maximum distance in a distance matrix of the boundary.

Figure 46B:
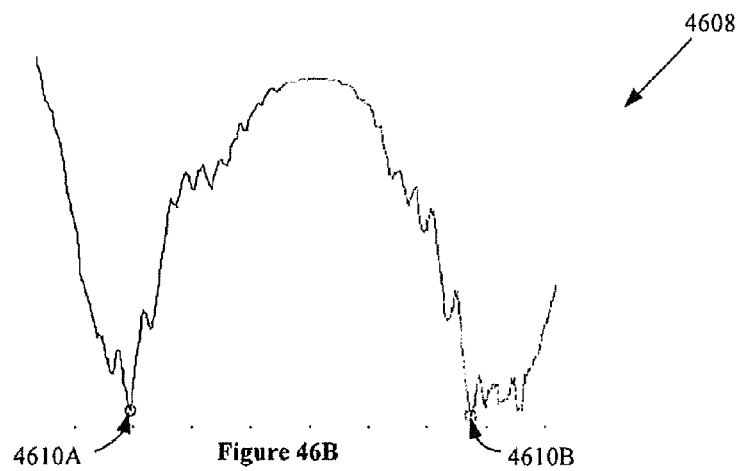
FIG. 46B is a graph of samples from the example distance matrix taken along a reference line.
Figure 46C:
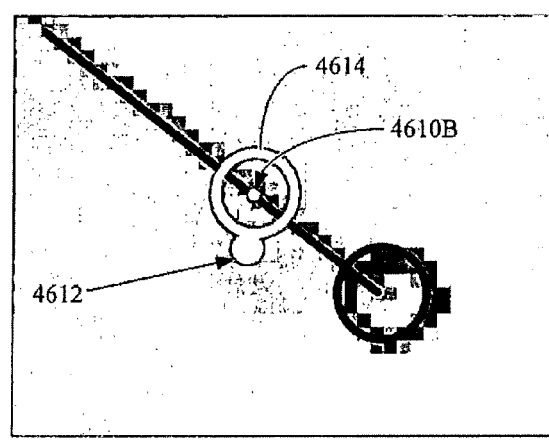
FIG. 46C is a surface representation of a portion of the example distance matrix showing a minimum width location.

The alternative feature extraction process includes the following steps, described with reference to FIGS. 46A-46C. The system 100 recovers each diagonal from the distance matrix as a vector; the diagonal vectors vary in size from a maximum (corner-to-corner) to a length of one (at the corner). The main diagonal 4602 is a zero vector (the distance of a point to the same point). For efficiency, sub-sample of points can be used to obtain a suitable estimate. The system 100 determines the variance and, the minimum value in each of the diagonal vectors, using the steps:

for $i==1$:length(distin)

$[(mnv(i)mnp(i)]=\min(\text{diag}(distin,i))$;

$va(i)=\text{var}(\text{diag}(distin,i))$;

end and corrects for the angle of the minimum position within each vector of the distance matrix using:

$mnp+[1:1:\text{length}(\text{round}(distin/2))-1]$.

As the diagonals are analysed away from this starting point, the adjacent distance between points is incremented. The maximum variance is encountered in the diagonals between the two peaks 4604A, 4604B of the maximum distance. By thresholding the minimum array found along the same diagonal section by its respective variance, a reference line 4606 can be determined which is suitable for determining the maximum and minimum dimensions of the contour which reside there. The system 100 applies a threshold (var<0.03) to the minimum leaving the minimum values along the main axis of the contour. The system 100 uses a least squares approach of the derived points to derive a line approximation derived after correction. The system 100 extracts the measurements from the distance matrix along the line approximation of the reference line 4606 to generate a vector of samples 4608, as shown in FIG. 46B. The system 100 determines reference minima 4610A, 4610B along the reference line 4606, then searches around these reference minima 4610A, 4610B to locate a true minimum 4612, e.g., using a slice 4614 from the distance matrix taken around the reference minima 4610A, 4610B, as shown in FIG. 46C.

Figure 47:
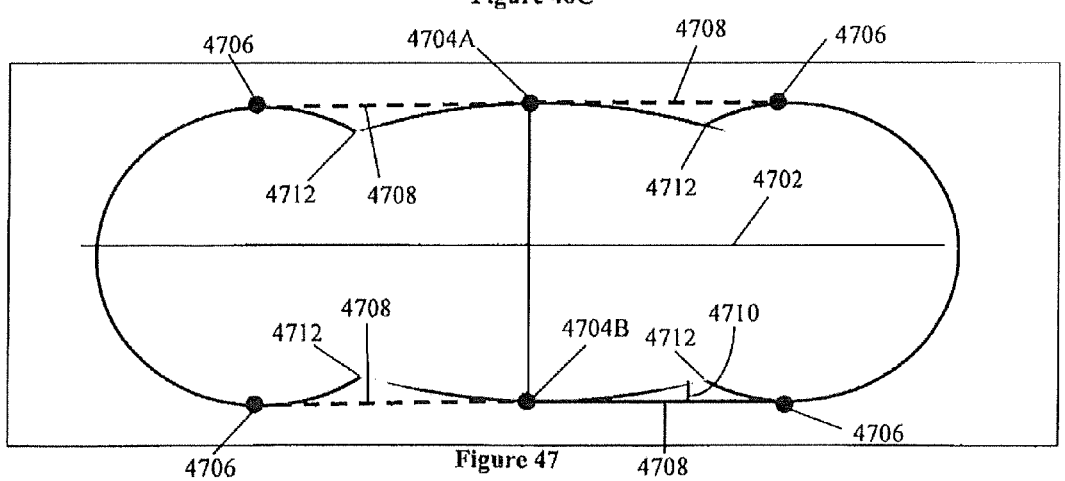
FIG. 47 is sketch of an animal contour showing lines used to determine the narrow points along the animal's sides.

An alternative method to determine the points of curvature, instead of using the Equation 1 described hereinbefore, is as follows, described with reference to FIG. 47. First a line 4702 of the points coinciding with the maximum length are found from the distance matrix. These points are then used to divide the contour into half, and then quarters. As the side mid-points 4704A, 4704B lie on the sides of the animal, a search can be performed using these as two reference points. The search for the curvature involves first locating another point 4706 some distance along the contour vector. A line array 4708 is then constructed between these two points with the same dimension as the distance between the points on the contour. The line array 4708 is a direct line between two points on the contour and comprises of same number of elements as the contour between the two points on the contour. Finally the distance 4710 between the line array and the section of the contour array are subtracted from one another. The minimum or maximum distance resolves the point; the maximum or minimum distance is chosen depending on what side of the animal is under investigation and the orientation of the animal. The point 4712 which is furthest from the section on the line is where the curve on the contour is likely to occur in a direction relative to the position of the point under investigation.

Figure 45:
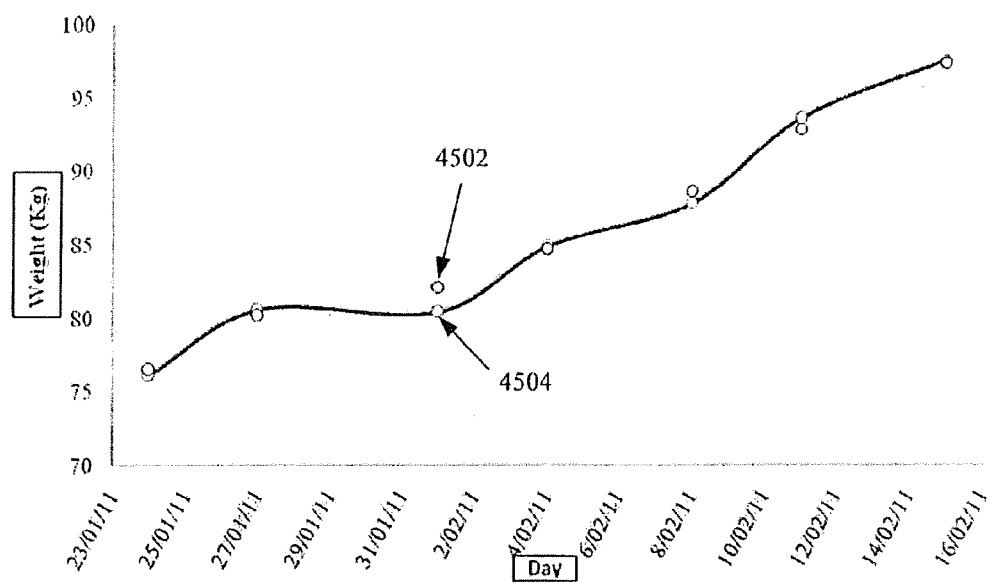
FIG. 45 is a graph of weight (in kilograms) over time (in days) for example pigs measured using the example image analysis process.

Using the example process 3500, a trial was conducted with 11 finisher pigs. When animal weight was measured using both scales and the system 100, the error in group average weight determined by the example process 3500 was less than about 2 kg, and only one day had an error greater than 1 kg, as shown in FIG. 45 (the scales results are represented by isolated points 4502, and the results from the system 100 are represented by connected points 4504). Each measure of group average weight was the average weight of all samples acquired of the 11 animals across the course of a day.

The above embodiment is directed to predicting the weight of an animal, such as a pig, based upon the two-dimensional image capture of the animal, selecting and filtering appropriate data to ensure that the image is representative of the animal and then using various mathematical algorithms and appropriate data analysis to determine the weight of the animal based upon empirical data.

In a further embodiment of the present invention it is proposed to determine the weight of the animal based upon the estimated volume of the animal rather than using a two-dimensional approximation of the animal profile. It is known that the volume of an animal such as a pig is very closely representative of its weight. Accordingly in a further embodiment of the invention estimates of animal weights use image and range imaging analysis that can be used to determine the volume of the animal and thus extrapolate its weight.

In its simplest form an object is detected within a range image and the object volume is measured using range data thus estimating the animals' weight using the dimensions that represent the animal's size.

The process includes the steps of:
acquiring the range image data representing a range image including an animal object representing an animal;
electing all points in the range image that are less than a distance representing the floor;
selecting individual connected solid objects in the set of points that are selected;
selecting the boundary of the connected solid objects;
selecting valid boundaries by selecting each sample boundary that matches a template boundary corresponding to an expected animal shape;
selecting subset of the valid boundary by detecting the animal head and removing it;
calculating the volume of the selected object by integration of the vertical distance of each point on the object to the floor; and
generating measurement data, representing a weight of the animal using the volume calculated.

In a yet further alternative embodiment, the weight estimation is generated by also measuring any combination of:
minimum and/or maximum height of the animal;
minimum and/or maximum width of the animal;
plan view area of the animal;
object volume without head removed;
fitting a 3-D model to the range image and then using the known key variables from the 3-D model to estimate the weight.

Figure 48:
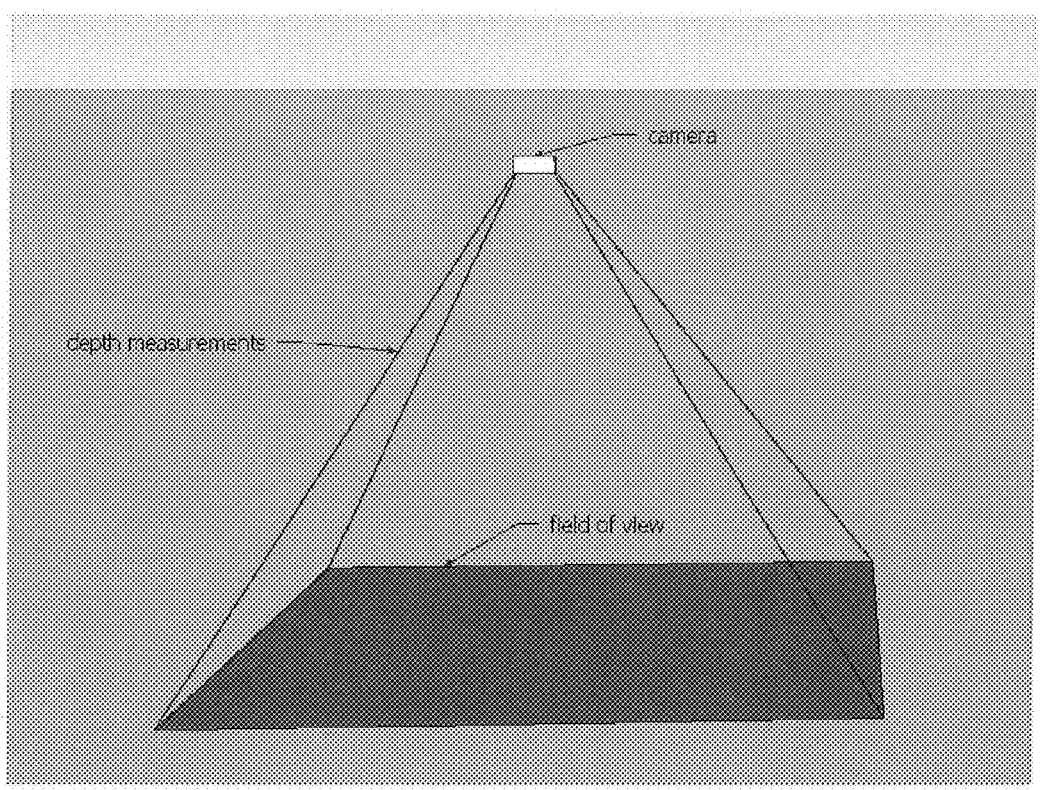
FIG. 48 is a sketch of the image and range analysis camera.

Illustrated in FIG. 48 is the image and range analysis camera where the depth information is encoded in a video stream avi, encoded using with the free lossless 'Lagarith" codec. The camera is mounted at some 2 meters in height and faces straight down. The depth and the visual data is recorded for the same events and in trials the manual weight information can be entered for each pig.

The depth information from the recording system is 10 bit, recorded as an absolute analog distance from the center of the physical array to each point within the field of view. With a resolution of some 640×480 pixels there are more than 300,000 individual distance measurements.

Figure 49:
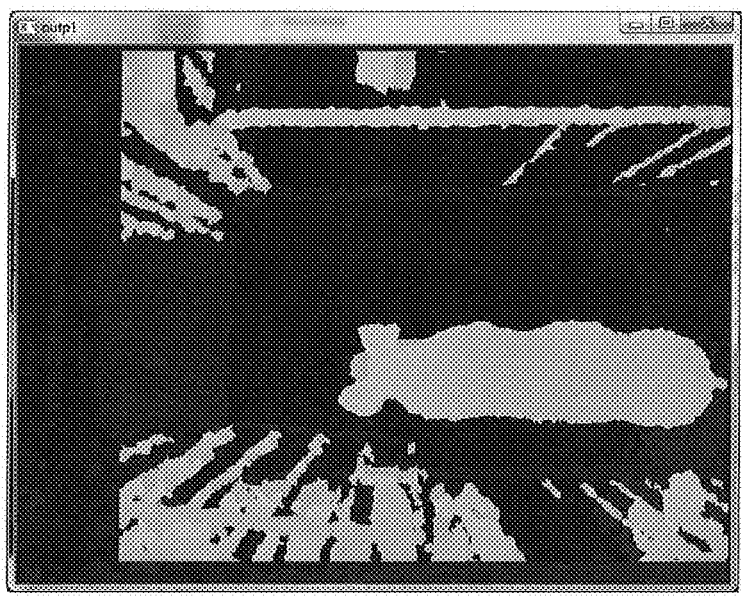
FIG. 49 illustrates the conversion of 'near' pixels into objects in relation to 3-D imaging.

All of the measurements are then converted form distance to real world co-ordinates (x,y,z), and pixels that are further than the camera depth less 10 cm are omitted. This eliminates the floor. FIG. 49 illustrates the conversion of the 'near' pixels into objects.

Figure 50:
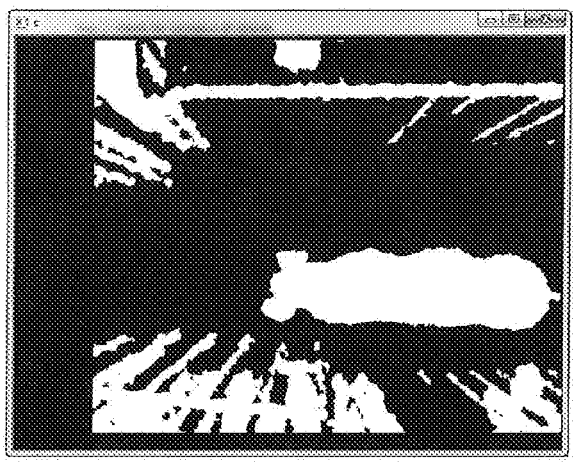
FIG. 50 illustrates the finding of the connected objects by tracing contours.
Figure 51:
FIG. 51 is a template of a pig with its head up.
Figure 52:
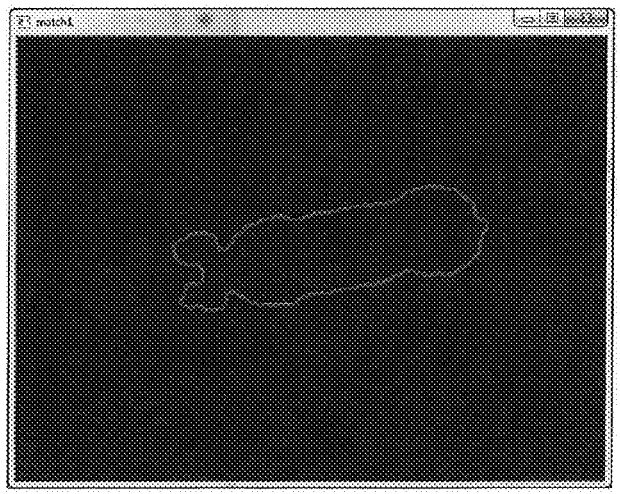
FIG. 52 is a template of a pig with its head down.

By tracing the contours one can then find all of the connected objects as illustrated in FIG. 50. For each object a match is made against two templates, one reflecting a head up of the pig and the other reflecting head down as illustrated in FIGS. 51 and 52. The matching process is rotation and size invariant so if the animal is indeed a pig it will match one of these two.

Figure 53:
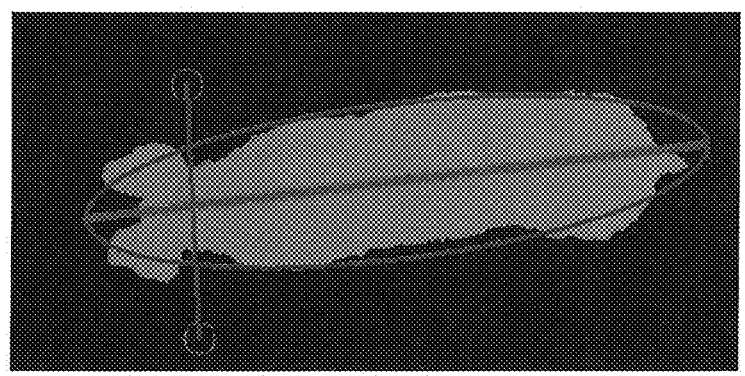
FIG. 53 illustrates the minimum fitted ellipse of a pig.
Figure 54:
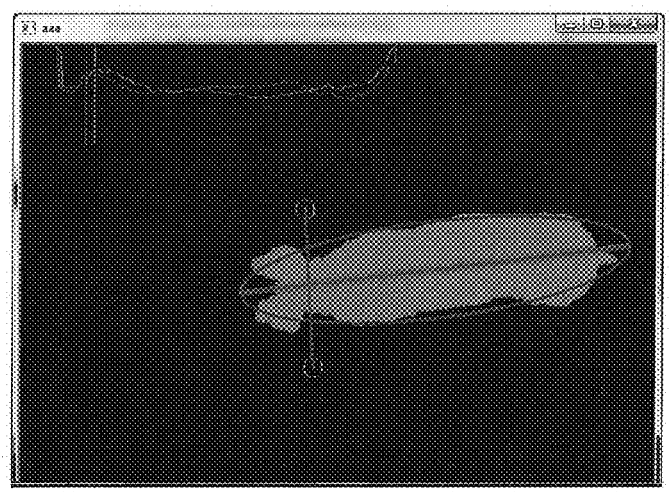
FIG. 54 illustrates the left and right contours of the pig.
Figure 55:
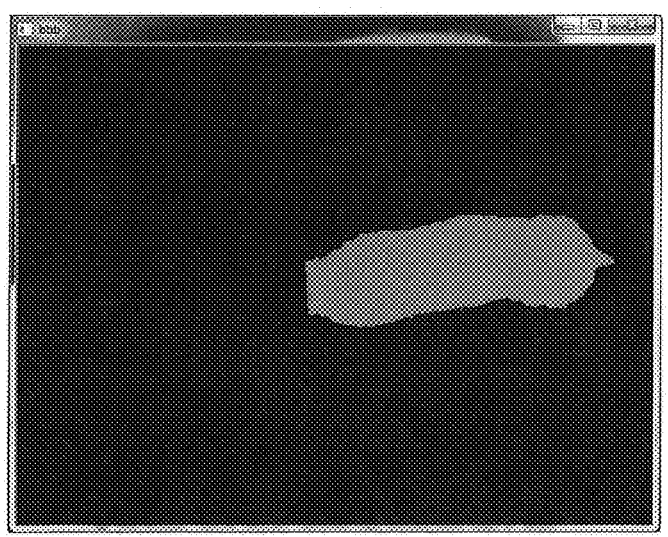
FIG. 55 illustrates the profile of the pig after the head has been removed.

The next step performed by the system involves finding the direction and the head. For each object that is matched to a template one calculates the minimum fitted ellipse. This provides the rectangle width and height, as well as the angle orientation as illustrated in FIG. 53. Subsequently from each point along the centreline of the ellipse one measures the perpendicular distance to the edge of the object, giving the left and right contours (FIG. 54). The process then involves searching back and forth along the contours to find a maxima/minima where the ratio is more than 10:9. Once both sides match this is indicative of the maximum inflection point behind the ears, and thus the head.

The maximum inflection points are extended to the extents of the bounding rectangle and this line is used to remove the head. The process then involves calculating the area of the full contour as well as the area of the removed head (trimmed area).

Figure 56:
FIG. 56 illustrates the 3-D point cloud of the pig without the head.
Figure 57:
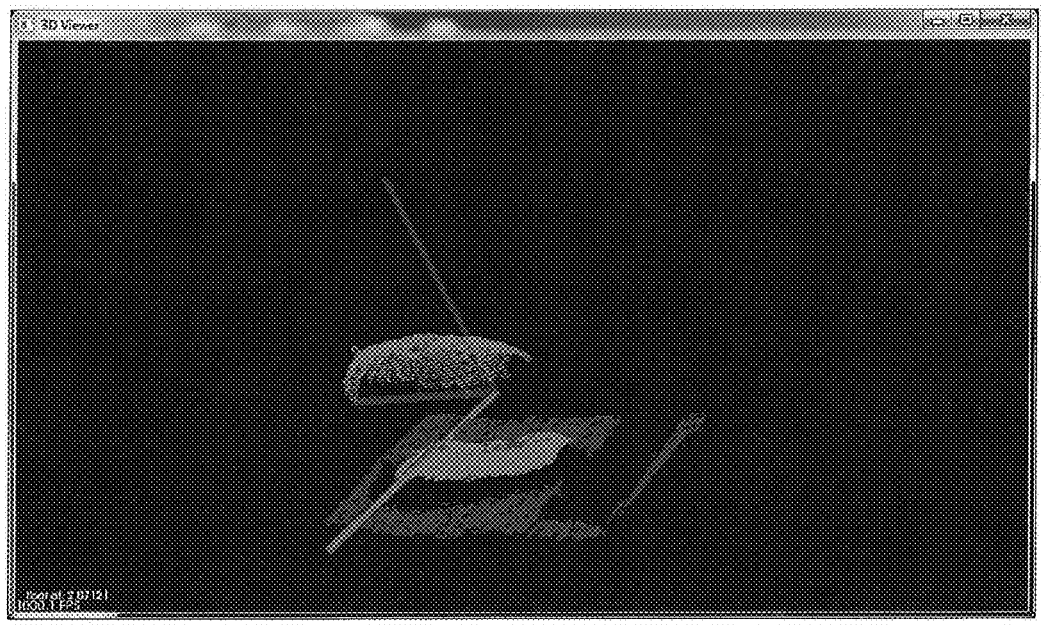
FIG. 57 illustrates the points cloud taking into account the floor.
Figure 58:
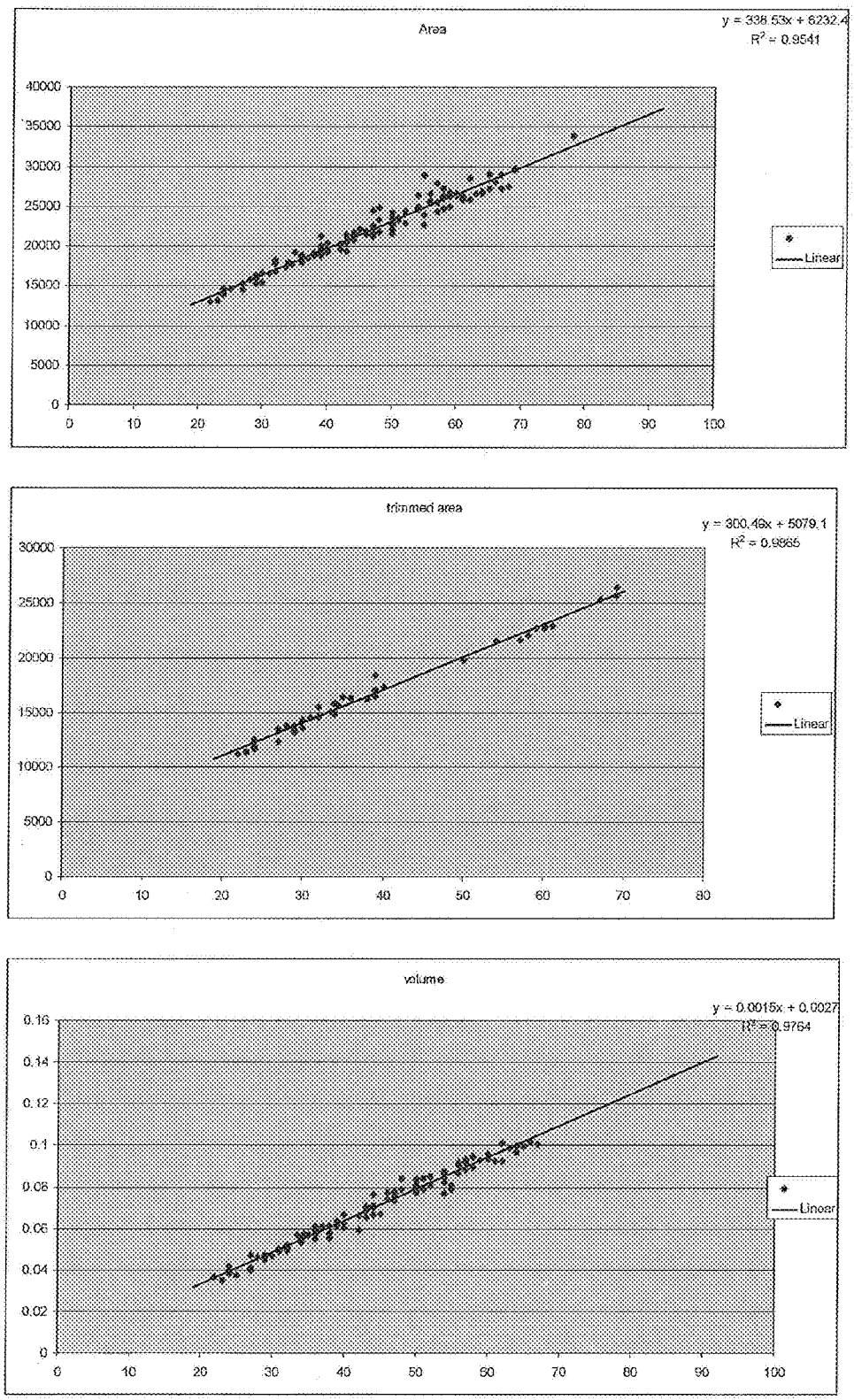
FIG. 58 illustrates results from a trial.

To provide 3-D information, each of the points in the trimmed head area are removed from the 3-D points. The bounding rectangle with the additional boundary is then used to convert the data into a 3-D point cloud as illustrated in FIG. 56. Using plane detection, the best plane that describes the floor is calculated and the points cloud is shifted so that the floor is at z=0 (FIG. 57). The process then integrates the 3-D convex hull to determine the volume of the trimmed 3-D contour.

The next step involves event accumulation where for each event, in this case being the video file), and array is constructed with each of the measurement items. At the end of the event, the following arrays are described.

array, count, mean, standard deviation (stdeviation).

The data can then be filtered or cleaned by excluding any data points more than the stdeviation from the mean. This event can then be marked as invalid if there are less than 3 sightings, or if the stdeviation/mean is greater than 5%. Given that there is a clear correlation with the volume of a pig and its weight, a database can be populated from empirical results where a pig is weighed and its volume measured using the above process. Thereafter, this database can be used to deduce a pig's weight by simply measuring its volume as per the process above.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

The invention claimed is:

1. A computer-implemented image analysis process for making animal measurements, including:
   acquiring the range image data representing a range image including an animal object representing an animal;
   electing all points in the range image that are less than a distance representing the floor;
   selecting individual connected solid objects in the set of points that are selected;
   selecting the boundary of the connected solid objects;
   selecting valid boundaries by selecting each sample boundary that matches a template boundary corresponding to an expected animal shape;
   selecting subset of the valid boundary by detecting the animal head and removing it;
   calculating the volume of the selected object by integration of the vertical distance of each point on the object to the floor; and
   looking up a database including information correlating the volume of the animal with a weight in the database.

* * * * *